US007545735B1

(12) United States Patent
Shabtay et al.

(10) Patent No.: US 7,545,735 B1
(45) Date of Patent: Jun. 9, 2009

(54) SCALABLE PROTECTION MECHANISM FOR HIERARCHICAL MULTICAST SERVICE IN RING BASED NETWORKS

(75) Inventors: Lior Shabtay, Ganai Tikva (IL); Yoav Kluger, Zichron Yakov (IL)

(73) Assignee: Atrica Israel Ltd., Herzelia (IL)

( * ) Notice: Subject to any disclaimer, the term of this patent is extended or adjusted under 35 U.S.C. 154(b) by 1265 days.

(21) Appl. No.: 10/386,044

(22) Filed: Mar. 11, 2003

(51) Int. Cl.
*G01R 31/08* (2006.01)
*H04L 1/00* (2006.01)
*H04L 12/28* (2006.01)
*H04L 12/56* (2006.01)

(52) U.S. Cl. .................. 370/217; 370/222; 370/405; 370/406

(58) Field of Classification Search .................. None
See application file for complete search history.

(56) References Cited

U.S. PATENT DOCUMENTS

| 4,596,982 | A | * | 6/1986 | Bahr et al. ................. 370/223 |
| 5,218,604 | A | * | 6/1993 | Sosnosky ................... 370/223 |
| 5,327,427 | A | * | 7/1994 | Sandesara .................. 370/222 |
| 5,491,686 | A | * | 2/1996 | Sato ........................... 370/223 |
| 5,859,836 | A | * | 1/1999 | Eslambolchi .............. 370/222 |
| 5,909,175 | A | * | 6/1999 | Yamasaki et al. .......... 340/506 |
| 6,233,221 | B1 | * | 5/2001 | Lowe et al. ................ 370/222 |
| 6,295,146 | B1 | * | 9/2001 | Nathan et al. .............. 398/50 |
| 6,389,015 | B1 | * | 5/2002 | Huang et al. .............. 370/376 |

(Continued)

FOREIGN PATENT DOCUMENTS

EP 1318648 * 12/2002

OTHER PUBLICATIONS

Le Roux et al., "P2MP MPLS-TE Fast Reroute with P2MP Bypass Tunnels", Network Working Group, draft-ietf-mpls-p2mp-te-bypass-01.txt, Jul. 2007.

(Continued)

*Primary Examiner*—Chi H Pham
*Assistant Examiner*—Warner Wong
(74) *Attorney, Agent, or Firm*—Zaretsk Patent Group; Howard Zaretsky

(57) ABSTRACT

A novel fast and scalable protection mechanism for protecting hierarchical multicast service in ring based networks. The mechanism of the present invention is especially suitable for use in Multi-Protocol Label Switching (MPLS) ring based networks such as Metro Ethernet Networks (MENs). The mechanism provides fast protection for MPLS based point-to-multipoint (P2MP) Label Switched Paths (LSPs) in a scalable manner. Each multicast connection on each ring in the network is split into two sub-LSPs: a primary P2MP sub-LSP originating on a primary node and a secondary P2MP sub-LSP originating on a secondary node traveling opposite to the primary path. For each node to be protected, a point-to-point protection tunnel is provisioned from that node to a secondary node that forwards the packets to the secondary path on all child rings connected to that parent ring through the protected node and that are provisioned to receive the specific multicast connection. In the event of a failure, all the multicast traffic on that ring is directed through the protection tunnel to the secondary node. Upon exiting the protection tunnel, the packets are forwarded to the secondary LSP on the child rings for which this node is the secondary node and also continue along the primary LSP on the parent ring and along all child rings for which this node is the primary node.

51 Claims, 10 Drawing Sheets

U.S. PATENT DOCUMENTS

| | | | |
|---|---|---|---|
| 6,400,682 B1* | 6/2002 | Regula | 370/223 |
| 6,639,893 B1* | 10/2003 | Chikenji et al. | 370/217 |
| 6,658,013 B1* | 12/2003 | de Boer et al. | 370/404 |
| 6,717,922 B2* | 4/2004 | Hsu et al. | 370/258 |
| 6,731,597 B1* | 5/2004 | Batchellor et al. | 370/223 |
| 6,744,769 B1* | 6/2004 | Siu et al. | 370/395.32 |
| 6,813,242 B1* | 11/2004 | Haskin et al. | 370/229 |
| 6,992,975 B1 | 1/2006 | Daniel et al. | 370/222 |
| 6,992,976 B1* | 1/2006 | Herrmann | 370/222 |
| 7,042,839 B2* | 5/2006 | Stewart et al. | 370/227 |
| 7,046,622 B2* | 5/2006 | Ying et al. | 370/222 |
| 7,054,264 B2* | 5/2006 | Mor | 370/223 |
| 7,058,845 B2* | 6/2006 | Fujita | 714/4 |
| 7,158,478 B1* | 1/2007 | Mazzurco et al. | 370/222 |
| 7,161,899 B2* | 1/2007 | Limaye et al. | 370/223 |
| 7,167,444 B1* | 1/2007 | Afferton | 370/222 |
| 7,170,852 B1* | 1/2007 | Adler | 370/223 |
| 7,209,975 B1* | 4/2007 | Zang et al. | 709/238 |
| 7,274,656 B2* | 9/2007 | Lee et al. | 370/223 |
| 7,324,440 B2* | 1/2008 | Takagi et al. | 370/222 |
| 7,330,424 B2* | 2/2008 | Nagamine et al. | 370/217 |
| 7,356,258 B1* | 4/2008 | Weverka et al. | 398/59 |
| 7,451,340 B2* | 11/2008 | Doshi et al. | 714/4 |
| 2002/0064166 A1* | 5/2002 | Suetsugu et al. | 370/403 |
| 2002/0172150 A1* | 11/2002 | Kano | 370/216 |
| 2003/0058790 A1* | 3/2003 | Nagamine | 370/222 |
| 2003/0103449 A1* | 6/2003 | Barsheshet et al. | 370/222 |
| 2003/0126287 A1* | 7/2003 | Charny et al. | 709/239 |
| 2004/0013085 A1* | 1/2004 | Klink | 370/216 |
| 2004/0156310 A1* | 8/2004 | Fredette et al. | 370/216 |
| 2006/0120279 A1* | 6/2006 | Mitsumori | 370/218 |

OTHER PUBLICATIONS

Vasseur et al., "IGP Routing Protocol Extensions for Discovery of Traffic Engineering Node Capabilities", Network Working Group, RFC 5073, Dec. 2007.

U.S. Appl. No. 10/210,852, filed Jul. 23, 2002, Shabtay et al.

Borden et al., "A Framework for Metro Ethernet Protection", Metro Ethernet Forum Technical Committee, Oct. 2002.

Borden et al., "An Implementation-agreement for Metro Ethernet Protection Using MPLS Mechanisms", Metro Ethernet Forum Technical Committee, Apr. 2002.

Pan et al., "Fast Reroute Extensions to RSVP-TE for LSP Tunnels", draft-ietf-mpls-revp-lsp-fastreroute-00:txt, Aug. 2003.

* cited by examiner

SCALABLE PROTECTION MECHANISM FOR HIERARCHICAL MULTICAST SERVICE IN RING BASED NETWORKS

FIELD OF THE INVENTION

The present invention relates generally to data communications and more particularly relates to a scalable protection mechanism for hierarchical multicast service in ring based networks.

BACKGROUND OF THE INVENTION

Currently, the number of data networks and the volume of traffic these networks carry are increasing at an ever increasing rate. The network devices making up these networks generally consist of specialized hardware designed to move data at very high speeds. Typical asynchronous packet based networks, such as Ethernet or MPLS based networks, are mainly comprised of end stations, hubs, switches, routers, bridges and gateways. A network management system (NMS) is typically employed to provision, administer and maintain the network.

Multiprotocol Label Switching (MPLS)

Multiprotocol Label Switching (MPLS) based networks are becoming increasingly popular especially in traffic engineering IP networks. MPLS uses a label switching model to switch data over a Label Switched Path (LSP). The route of an LSP is determined by the network layer routing function or by a centralized entity (e.g., a Network Management System) from the topology of the network, the status of its resources and the demands of the user. Any suitable link state routing protocol may be used such as Open Shortest Path First (OSPF) or Intermediate System to Intermediate System (ISIS) routing protocol to provide the link state topology information needed by the network layer routing to engineer data traffic. Another possibility is to utilize a local neighbor-discovery protocol whereby the global topology is maintained by a centralized management entity. LSPs may be setup using any suitable signaling protocol such as RSVP-TE, CR-LDP or using the management plane (e.g., the NMS setting the relevant MIB items that create the LSPs).

There is increasing demand by users that networks include a mechanism for fast repair of the services delivered by the network upon failure of network resources such as links or nodes. Since a LSP traverses a fixed path in the network, its reliability is dependent on the links and nodes along the path. It is common for many networks to provide some form of protection in the event of failure. For example, in the event of a link or node failure, the network can be adapted to switch data traffic around the failed element via a protection route.

The protection of traffic can be accomplished in several ways using the MPLS framework. Two ways that traffic can be protected using MPLS include recovery via LSP rerouting or via MPLS protection switching or rerouting actions.

The two basic models for path recovery include path rerouting and protection switching. Protection switching and rerouting may be used in combination. For example, protection switching provides a quick switchover to a recovery path for rapid restoration of connectivity while slower path rerouting determines a new optimal network configuration at a later time.

In recovery by path rerouting, new paths or path segments are established on demand for restoring traffic after the occurrence of a fault. The new paths may be chosen based upon fault information, network routing policies, pre-defined configurations and network topology information. Thus, upon detecting a fault, paths or path segments to bypass the fault are established using the signaling protocol or the NMS. Note that reroute mechanisms are inherently slower than protection switching mechanisms, since more processing and configuring must be done following the detection of a fault. The advantage of reroute mechanisms is that they are cheaper since no resources are committed until after the fault occurs and the location of the fault is detected. An additional advantage of reroute mechanisms is that the LSP paths they create are better optimized, and therefore consume less network resources.

Note also that once the network routing algorithms have converged after a fault, it may be preferable, to re-optimize the network by performing a reroute based on the current state of the network and network policies in place.

In contrast to path rerouting, protection switching recovery mechanisms pre-establish a recovery path or path segment, based on network routing policies and the restoration requirements of the traffic on the working path. Preferably, the recovery path is link and node disjoint with the working path. When a fault is detected, the protected traffic is switched over to the recovery path(s) and restored.

The resources (i.e. bandwidth, buffers, processing, etc.) on the recovery path may be used to carry either a copy of the working path traffic or extra traffic that is displaced when a protection switch occurs leading to two subtypes of protection switching. In the first, known as 1+1 protection, the resources (bandwidth, buffers, processing capacity) on the recovery path are fully reserved, and carry the same traffic as the working path. Selection between the traffic on the working and recovery paths is made at the path merge LSR (PML).

In the second, known as 1:1 protection, the resources (if any) allocated on the recovery path are fully available to low priority or excess information rate (EIR) traffic except when the recovery path is in use due to a fault on the working path. In other words, in 1:1 protection, the protected traffic normally travels only on the working path, and is switched to the recovery path only when the working path has a fault. Once the protection switch is initiated, the low priority or EIR traffic being carried on the recovery path is displaced by the protected traffic. This method affords a way to make efficient use of the recovery path resources.

An example of protection switching in MPLS networks is described below. Consider an example MPLS based network incorporating a bypass tunnel. The network comprises a plurality of label switched routers (LSRs) connected by links. Backup (i.e. bypass) tunnels are established for protecting LSPs statically by the management station or using RSVP signaling. RSVP extensions for setting up protection (bypass) tunnels have been defined. To meet the needs of real-time applications such as video on demand, voice over IP, Circuit Emulation Service (CES), etc., it is desirable to affect the repair of LSPs within tens of milliseconds. Protection switching can provide such repair times.

The LSPs can also be protected (i.e. backed up) using the label stacking capabilities of MPLS. Instead of creating a separate LSP for every backed-up LSP, a single LSP is created which serves to backup a set of LSPs. Such a LSP is termed a bypass tunnel. The bypass tunnel itself is established just like any other LSP-based tunnel. The bypass tunnel must intersect the original LSP(s) somewhere downstream of the point of local repair. Note that this implies that the set of LSPs being backed up all pass through a common downstream node. Candidates for this set of tunnels include all LSPs that pass through the point of local repair, through the facility being bypassed and through to the point at which the bypass tunnel terminates.

To repair the backed up tunnels, packets belonging to a failed tunnel are redirected onto the bypass tunnel. An additional label representing the bypass tunnel is stacked onto the redirected packets. At the last LSR of the bypass tunnel, the label for the bypass tunnel is popped off the stack, revealing the label that represents the tunnel being backed up. An alternative approach is to pop the bypass-tunnel label at the penultimate LSR of the bypass tunnel.

Multicast Service

The demand for multicast capability in networks is currently increasing at a steady rate. Multicast connections differ from unicast connections. A unicast connection is a point to point connection. In contrast, a multicast connection is a point to multipoint (P2MP) connection whereby a single copy of a packet is forwarded along a multicast tree to all users that requested to receive a copy. Users subscribe or register with a server (typically the nearest router) requesting to receive a particular multicast source. Without the ability to send data via multicast connections, a huge number of unicast connections would otherwise be required, which most networks are not likely to be able to support. The use of multicast connections thus enables efficient distribution of a wide variety of data including audio, video and data.

Protection

It is becoming increasingly more common today to build networks from two or more subnetworks. As an example, consider a network that is built from two main parts: (1) a core network or transport portion, and (2) an edge network or access portion. Such networks are typically used by telecommunication carriers, for example, to provide one type of network to users for access purposes and to use a different type of network for transport of user data. In one common network configuration, the access or network edge portion is 802.1Q VLAN based and comprises edge switches that are adapted to handle VLAN tagged packets. Connections in the edge portion are provisioned using static VLAN configurations. The core portion comprises core switches that implement standard MPLS.

Protection, especially fast protection in the sub 50 millisecond range, in the core MPLS based network can be provided in several ways as outlined by the IETF, by the ITU and by the MEF. For example, see Borden et al., "A Framework for Metro Ethernet Protection," MEF Technical Committee, October 2002; Borden et al., "An implementation-agreement for Metro Ethernet Protection using MPLS Mechanism," MEF Technical Committee, April 2002; and Ping Pan et al., "Fast Reroute Extensions to RSVP-TE for LSP Tunnels", draft-ietf-mpls-rsvp-lsp-fastreroute-01.txt, Internet Engineering Task Force, MPLS Working Group, November 2002, all of which are incorporated herein by reference in their entirety.

As described above, two types of protection include end-to-end protection and local protection. The former provides an alternative backup path in the event a failure occurs along the primary path. The latter provides protection at the core wherein each link (or possibly also each node, or each other resource, in accordance with the protection-tunnels deployed) is protected by a backup protection tunnel. In the event of a link failure, MPLS provides local protection to quickly restore traffic through the bypass protection tunnel.

With the proliferation of the use of multicast connections in networks, a mechanism of providing fast protection is desirable. Multicast distribution of data in MPLS networks is typically achieved using point to multipoint LSPs to create multicast distribution trees. The protection of these multicast distribution trees is gaining in importance as the number of clients grows and the volume of data distributed via these trees increases.

Multicast protection schemes are well-known in the art. One solution is to use standard multicast protocols to perform rerouting in the event of a failure. The multicast routing protocols are effective to calculate a path around the failed link or node. A disadvantage of this scheme is the time it takes to affect a new route and restore traffic around the failure. This is due to the fact (1) that the reroute process is typically performed by the upper protocol layers that are almost always software based and (2) that the reroute process typically requires the involvement of signaling and/or management based processes. Using such a scheme it is virtually impossible to achieve sub 50 msec protection times.

Another disadvantage of this scheme is that it is not scalable. For each multicast connection to be protected, a reroute process must be performed in the event of a failure. Depending on the topology and the number of multicast connections, it may take a relatively long time to restore all multicast traffic affected by a failure.

Another solution to the multicast protection problem is the fast-reroute mode of using per protected-LS P1:1 detour-LSPs at each hop. A major disadvantage of this scheme is that it is not scalable due to the very large number of LSPs required to establish each protected tunnel.

The use of bypass tunnels has been suggested for protection of unicast connections in MPLS based networks. In this technique, all the unicast connection traffic traveling in the same direction is aggregated and sent over a single protection tunnel. Since it is expected that many point-to-point LSPs are headed in the same direction, this technique is effective in bypassing the failure and delivering the traffic to the node just following the failure. At that point, the traffic continues over the original point-to-point LSP.

The bypass mechanism utilizes the stacking feature of MPLS whereby the label of the protection tunnel is pushed onto the MPLS stack of each packet. The packet then travels through the protection tunnel. At the end of the protection tunnel, the protection tunnel label is popped and the original LSP label becomes the outer label and is sent along the original LSP.

This technique is effective in providing fast protection for unicast connection traffic. It cannot, however, be used with multicast traffic. The problem is that the multicast distribution tree typically heads in many directions. Unlike unicast connection traffic, multicast traffic cannot be aggregated because of its nature. The multicast tree travels in many different directions and thus a single bypass tunnel cannot be used to protect the many branches of multicast distribution trees. It is sufficient that even a single branch of a multicast distribution tree not go in the same direction to make the use of aggregation tunnels to protect multicast traffic impractical.

Thus there is need for a protection mechanism that is capable of providing fast scalable protection for multicast distribution service in networks.

SUMMARY OF THE INVENTION

The present invention provides a protection mechanism capable of providing fast scalable protection to multicast service in a network. The mechanism of the present invention is especially suitable for use in Multi-Protocol Label Switching (MPLS) ring based networks. The mechanism can be extended to support other topologies as well by logically mapping a multiple ring topology over the existing topology. The mechanism is operative to provide fast protection for MPLS based point-to-multipoint (P2MP) Label Switched Paths (LSPs) in a scalable manner. The invention is applicable to many types of networks, Metro Ethernet Networks (MENs) in particular.

The invention provides scalable protection for multicast service by providing both provisioning and protection methods. In accordance with the invention each multicast connection is built from two P2MP LSPs, including a primary and secondary LSP, whereby each protects the other. Each one of these LSPs can be logically viewed as being built from a plurality of sub-LSPs. A sub-LSP being defined as a portion of an LSP that runs over the links of a specific ring. Therefore, each ring comprises two sub-LSPs for each connection: a primary P2MP sub-LSP and a secondary P2MP sub-LSP. The two sub-LSPs travel in opposite directions, i.e. one travels in a clockwise direction and the other in a counter clockwise direction. The primary sub-LSP originates from an upstream primary port and the secondary sub-LSP originates from an upstream secondary port. The two ports are typically on different nodes (i.e. a primary node and secondary node) but may be the same physical node. In the case of a single physical node, the physical node is logically divided into two logical nodes.

For each node in a parent ring to be protected, a point-to-point protection tunnel is provisioned from the node to the next node in that ring along the primary sub-LSP. Multicast traffic normally travels only on the primary LSP of each ring, traveling from parent ring to child rings via the primary node. In the event of a failure, all the multicast traffic on that ring is directed through the protection tunnel to the secondary node. Upon exiting the protection tunnel, the packets (1) are forwarded to both the secondary LSP on all the child rings for which the node at which the tunnel ends is the secondary node and (2) continue along the primary LSP along the parent ring and (3) are forwarded to all child rings for which this node is the primary node.

The advantages of the multicast protection mechanism of the present invention include (1) obviating the requirement of provisioning a separate detour P2MP LSP for each and every P2MP LSP at each and every hop along the original multicast connection; (2) use of a single point-to-point bypass tunnel to aggregate many multicast connections provides scalability; (3) the number of bypass tunnels required to provide protection is significantly reduced compared to what would be required using the prior art techniques.

It is important to also note that the invention is not limited by the type of network in use, the PHY layer, the type of protection paths used or by the type of signaling in use or by whether provisioning is based on signaling or performed in the management plane. Examples of applicable networks include, but are not limited to, Ethernet, MPLS and Private Network to Network Interface (PNNI) based Asynchronous Transfer Mode (ATM) networks.

Note that the invention is suited for implementation in hardware such as a network processor (which may comprise a network-processor chip, an FPGA, an ASIC, etc.), adapted to implement the mechanism of the present invention, software or a combination of hardware and software. In one embodiment, a network device (such as a core switch or edge switch) comprising a processor, memory, etc. is operative to execute software adapted to perform the fast protection mechanism of the present invention.

There is thus provided in accordance with the present invention, a method of providing multicast service protection in a ring based network, the method comprising the steps of provisioning a protected multicast connection as two Label Switched Paths (LSPs) including a primary point-to-multipoint (P2MP) LSP comprising a primary sub-LSP in each ring traversed by the connection and originating at a primary port, and a secondary P2MP LSP comprising a secondary sub-LSP in each ring traversed by the connection and originating at a secondary port, wherein the secondary sub-LSP runs in a direction opposite to that of the primary sub-LSP, in each ring of the protected multicast connection, provisioning at least one point-to-point protection tunnel in one or both directions for each node to be protected, the protection tunnel having entry points in the node to be protected and/or a neighboring node upstream (relative to the primary LSP) of the node to be protected and ending at a neighboring node downstream of the node to be protected, in the event of a failure of a link or node, activating the protection tunnel protecting the failed link or node, directing packets over the activated protection tunnel and forwarding packets received over the activated protection tunnel at the neighboring downstream node to secondary LSPs on all descendent rings for which the downstream node is the secondary node and to the primary LSP on all descendent rings for which the downstream node is the primary node.

There is also provided in accordance with the present invention, a method of provisioning a protected hierarchical multicast service in a ring based network, the method comprising the steps of creating a primary point-to-multipoint (P2MP) Label Switched Path (LSP) by provisioning in each ring of a protected multicast connection a primary sub-LSP originating at an upstream primary port, Creating a secondary P2MP Label Switched Path (LSP) by provisioning in each ring of the protected multicast connection a secondary sub-LSP originating at a secondary port, which is downstream in the parent ring and traveling in a direction opposite to that of the primary LSP, in each ring of the protected multicast connection, provisioning at least one point-to-point protection tunnel in one or both directions for each node to be protected, the protection tunnel having entry points in the node to be protected and/or the neighboring node upstream to that node and ending at the neighboring node downstream to that node and configuring the downstream neighboring node to forward packets received thereon from a protection tunnel activated in response to a failure, to secondary LSPs on all descendent rings for which this node is the node in which their secondary port is located, to the primary LSP on the parent ring and to the descendant rings for which this node is the one in which their primary port is located.

There is further provided in accordance with the present invention, a method of protecting hierarchical multicast service in a ring based network, the method comprising the steps of splitting the multicast connection into a primary point-to-multipoint (P2MP) Label Switched Path (LSP) comprising a plurality of primary sub-LSPs, and a secondary P2MP LSP comprising a plurality of secondary sub-LSPs, a primary sub-LSP and secondary sub-LSP established on each ring the protected multicast connection traverses, the primary sub-LSP originating on a primary node and the secondary sub-LSP originating on a secondary node and traveling in a direction opposite to that of the primary sub-LSP, the secondary sub-LSP serving as protection for the primary sub-LSP, in the event of a failure, directing all primary LSP traffic on a parent ring through a point-to-point protection tunnel on the parent ring and forwarding the traffic arriving at the end of the protection tunnel at a first node on the parent ring to secondary LSPs on all descendent rings for which the first node is the secondary node and to the primary LSP on all descendent rings for which the first is the primary node.

There is also provided in accordance with the present invention, a system for protecting hierarchical multicast service in a ring based network comprising means for splitting the multicast connection into a primary point-to-multipoint (P2MP) Label Switched Path (LSP) comprising a plurality of primary sub-LSPs, and a secondary P2MP LSP comprising a plurality of secondary sub-LSPs, a primary sub-LSP and secondary sub-LSP established on each ring the protected multicast connection traverses, the primary sub-LSP originating on a primary node and the secondary sub-LSP originating on a secondary node and traveling in a direction opposite to that of the primary sub-LSP, the secondary sub-LSP serving as protection for the primary sub-LSP, means for directing all primary LSP traffic on a parent ring through a point-to-point protection tunnel on the parent ring in the event of a failure and means for forwarding the traffic arriving at the end of the protection tunnel at a first node on the parent ring to secondary sub-LSPs on all descendent rings for which the first node is the secondary node and to the primary sub-LSP on all descendant rings for which the first is the primary node.

There is further provided in accordance with the present invention, a network switch comprising a plurality of ports for interfacing the network switch to one or more communication links, a network processor, software means adapted to be executed by the network processor and operative to: provide support for splitting the multicast connection into a primary point-to-multipoint (P2MP) Label Switched Path (LSP) comprising a plurality of primary sub-LSPs, and a secondary P2MP LSP comprising a plurality of secondary sub-LSPs, a primary sub-LSP and secondary sub-LSP established on each ring the protected multicast connection traverses, the primary sub-LSP originating on a primary node and the secondary sub-LSP originating on a secondary node and traveling in a direction opposite to that of the primary sub-LSP, the secondary sub-LSP serving as protection for the primary sub-LSP, provide support for directing all primary LSP traffic on a parent ring through a point-to-point protection tunnel on the parent ring in the event of a failure and provide support for forwarding the traffic arriving at the end of the protection tunnel at a first node on the parent ring to secondary LSPs on all descendent rings for which the first node is the secondary node and to the primary LSP on all descendant rings for which the first is the primary node.

There is also provided in accordance with the present invention, a system for protecting Label Switched Paths (LSPs) in a network having a plurality of nodes connected by one or more facilities, each facility comprising a plurality of LSPs, the system comprising means for provisioning at least one protection tunnel, the at least one protection tunnel for protecting a particular node and the at least one protection tunnel adapted, upon failure of a facility protected thereby, to transport packets from a plurality of first LSPs carried over the facility such that upon exiting the protection tunnel, the packets are transmitted over a plurality of second LSPs which are different than the plurality of first LSPs they originated from.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
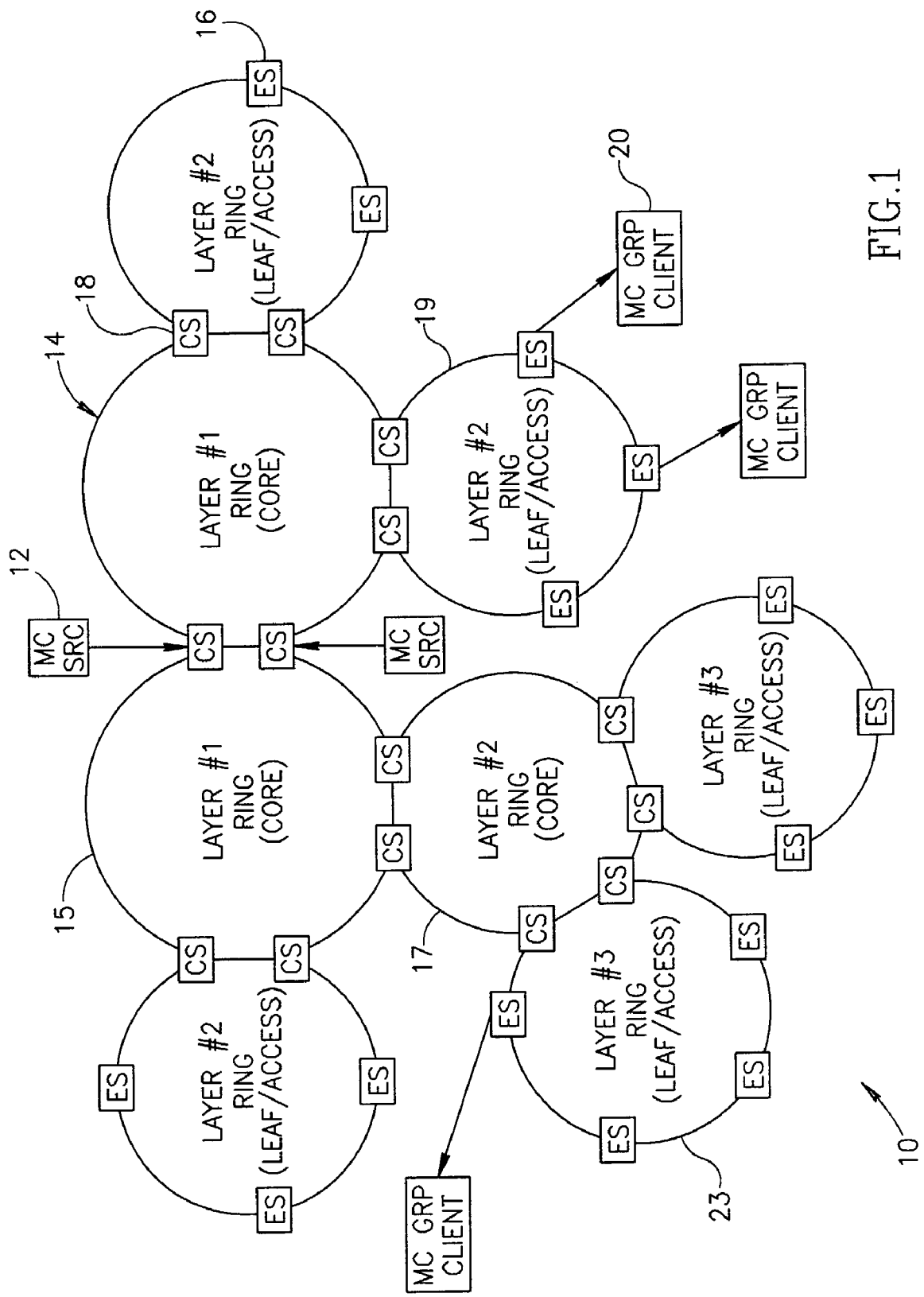
FIG. 1 is a diagram illustrating an example ring based network adapted to provide hierarchical multicast service.

The following notation is used throughout this document.

| Term | Definition |
| --- | --- |
| ASIC | Application Specific Integrated Circuit |
| ATM | Asynchronous Transfer Mode |
| CD-ROM | Compact Disc-Read Only Memory |
| CPU | Central Processing Unit |
| CR-LDP | Constraint-based Label Distribution Protocol |
| CS | Core Switch |
| CSIX | Common Switch Interface |
| DAT | Digital Audio Tape |
| DSP | Digital Signal Processor |
| DVD | Digital Versatile Disk |
| EEPROM | Electrically Erasable Programmable Read Only Memory |
| EIR | Excess Information Rate |
| EPROM | Erasable Programmable Read Only Memory |
| ES | Edge Switch |
| FDDI | Fiber Distributed Data Interface |
| FE | Fast Ethernet |
| FPGA | Field Programmable Gate Array |
| GE | Gigabit Ethernet |
| IETF | Internet Engineering Task Force |
| IP | Internet Protocol |
| ISIS | Intermediate System to Intermediate System |
| ITU | International Telecommunications Union |
| LAN | Local Area Network |
| LSP | Label Switched Path |
| LSR | Label Switching Router |
| MAC | Media Access Control |
| MEF | Metro Ethernet Forum |
| MEN | Metro Ethernet Network |
| MIB | Management Information Base |
| MPLS | Multi-Protocol Label Switching |

-continued

| Term | Definition |
| --- | --- |
| NIC | Network Interface Card |
| NMS | Network Management System |
| OSPF | Open Shortest Path First |
| PC | Personal Computer |
| PDH | Plesiochronous Digital Hierarchy |
| PML | Path Merge LSR |
| PNNI | Private Network to Network Interface |
| PSL | Path Switch LSR |
| RAM | Random Access Memory |
| ROM | Read Only Memory |
| RPR | Resilient Packet Ring |
| RSVP | Reservation Protocol |
| RSVP-TE | Reservation Protocol with Traffic Engineering extensions |
| SDH | Synchronous Digital Hierarchy |
| SONET | Synchronous Optical Network |
| TDM | Time Division Multiplexing |

DEFINITIONS USED THROUGHOUT

The following terms and definitions apply throughout this document.

A protection tunnel is defined as a bypass tunnel whereby different LSPs are able to share the same tunnel in order to bypass a failed facility. They may be created using any suitable mechanism such as using standing MPLS protocols.

The term ring based network is defined any network constructed from one or more interconnected rings.

A parent ring is defined as an upstream ring (relative to a root ring) that receives data on a multicast connection before any connected downstream rings. The terms child ring and descendant ring are defined as a downstream ring (relative to a root ring) that receives data on a multicast connection after any connected upstream parent rings. A core ring is defined as a ring constructed from core switches only, has child rings attached to it but no users directly attached to it. The terms leaf ring and access ring are defined as a ring built only from edge switches, and that does not have any child rings attached thereto.

A point to multipoint LSP is defined as an LSP that enters each of the nodes in its path through a single port, but exits one or more of these nodes through multiple ports.

Rerouting is defined as a procedure for changing the route of a traffic path. Rerouting can serve as a recovery mechanism in which the broken path, the recovery path or segments of these paths are created dynamically after the detection of a fault on the working path. In other words, rerouting can serve as a recovery mechanism in which the recovery path is not pre-established. Rerouting can also serve as an optimization mechanism in which path routes are dynamically changed to ones that are better suited for current network conditions.

Protection switching is defined as a recovery mechanism in which the recovery path is created prior to the detection of a fault on the working path, path segment or network segment it protects. In other words, a recovery mechanism in which the recovery path is preestablished. Protection bandwidth is defined as bandwidth on a link reserved for protection purposes, e.g., protection tunnels, bypass tunnels, recovery path, detour paths and protection paths.

The working path is the protected path that carries traffic before the occurrence of a fault. The working path exists, in MPLS networks for example, between a PSL and PML. The working path can be of different kinds; a hop-by-hop routed path, a trunk, a link, an LSP, part of an LSP, a group of LSP parts or part of a multipoint-to-point LSP. The term primary path is a synonym for a working path. The active path is the path that is currently active, which may comprise the working (i.e. primary) path or the recovery (i.e. alternative or protection) path.

The recovery path is the path by which traffic is restored after the occurrence of a fault. In other words, the path on which the traffic is directed by the recovery mechanism. The recovery path may be established by MPLS means. The terms backup path, alternative path and protection path are synonyms for a recovery path.

A switchover is the process of switching the traffic from the path that the traffic is flowing on onto one or more alternate path(s). This may involve moving traffic from a working path onto one or more recovery paths, or may involve moving traffic from a recovery path(s) on to a more optimal working path(s). A switchback is the process of returning the traffic from one or more recovery paths back to the working path(s).

MPLS protection domain refers to the set of LSRs over which a working path and its corresponding recovery path are routed. MPLS protection plan refers to the set of all LSP protection paths and the mapping from working to protection paths deployed in an MPLS protection domain at a given time.

The term MPLS-based recovery refers to the ability to quickly restore traffic lost due to a fault in an MPLS-network. The fault may be detected on the MPLS layer or in lower layers over which MPLS traffic is transported. The fastest MPLS recovery is typically achieved using protection switching. The MPLS LSR switchover time is comparable to the 50 ms switchover time of SONET.

The primary port of a ring with regard to a specific P2MP connection is the port from which packets traveling along the primary-LSP enter the ring. This can be a port in a node that is common to this ring and its parent ring or a port in a node that is directly connected to the multicast source. The node to which the primary port is connected is defined as the primary node. The secondary port and node of a ring with regard to a specific multicast connection are defined in the same way with regard to the secondary-LSP. It is assumed that the topology is such that the primary and secondary nodes of each ring are neighbors in the parent ring, or that they are the same physical node. If a ring does not have a portion of the multicast connection sub-LSPs in it, no node is considered its primary or secondary node and no port is considered its primary or secondary port with regard to that particular connection.

DETAILED DESCRIPTION OF THE INVENTION

The present invention provides a protection mechanism capable of providing fast scalable protection to multicast service in a network. The mechanism of the present invention is especially suitable for use in Multi-Protocol Label Switching (MPLS) ring based networks. The mechanism is operative to provide fast protection for MPLS based point-to-multipoint (P2MP) Label Switched Paths (LSPs) in a scalable manner. The invention provides scalable protection for multicast service by providing both provisioning and protection methods, described in detail infra.

For illustration purposes, the principles of the present invention are described in the context of a hierarchical multicast network constructed from a plurality of MPLS and/or VLAN based rings. The invention is not intended to be limited to the examples described herein and other types of networks and protocols are contemplated as well. For example, networks that do not have a physical ring topology can be configured to have logical rings. The protection mechanism of the present invention can then be applied to this logical network.

It is intended that the mechanism of the present invention be implemented in the core and edge switches of the network. It is not intended, however, that the invention be limited to the configurations and embodiments described herein. It is appreciated that one skilled in the networking, electrical and/or software arts may apply the principles of the present invention to numerous other types of networking devices and network configurations as well without departing from the spirit and scope of the invention.

Hierarchical Ring Based Multicast Networks

A diagram illustrating an example ring based network adapted to provide hierarchical multicast service is shown in FIG. 1. The example network, generally referenced 10, comprises a plurality of rings 14, a plurality of multicast sources 12, a plurality of core switches (CS) 18, a plurality of multicast group clients 20 and a plurality of edge switches (ES) 16. One function of the network is to provide a hierarchical multicast service. The hierarchical multicast service assumes the network is built from a hierarchy of rings, where the multicast source is attached to a device, which is regarded as the root device for multicast services originating at that multicast server. As will be described infra, in accordance with the present invention, the multicast source may be placed anywhere in the network, either in a core ring or leaf ring.

Rings in which the root device is a member are descendants of the root device. A hierarchy is defined between the rings in which each ring is directly connected to its parent. Each descendant ring may be connected to its parent ring through two neighboring nodes: a primary node and a secondary node. The system may contain any number of, multicast sources, each multicast comprising a server operative to send multicast traffic.

The flow of information in the network is from the root, which is where the multicast source is located, with propagation of the multicast data through the hierarchy of rings, down to the leaf rings. The exact subset of rings that should receive each multicast connection is provisioned through the management plane. The multicast groups to which the multicast source transmits are mapped into the multicast connections in a one-to-one manner (i.e. one multicast connection for each multicast group) or in a many-to-one manner (i.e. one multicast connection for a number of multicast groups). With many-to-one provisioning, the multicast connection should reach all the destinations of all the multicast-groups that are mapped to it.

Users are connected to the network only at the leaf rings, which are constructed from edge switches only. Non-leaf rings are built only from core switches. Each of the edge switches receives all the multicast connections that are provisioned to reach its ring. The edge switches are adapted to perform multicast filtering so that each user receives only the multicast-groups currently being requested.

The multicast filtering is driven by Internet Group Management Protocol (IGMP) messages sent by the user, indicating the multicast groups currently being requested. The IGMP messages sent by a user are received by the edge switches to which it is directly attached, and the edge switch uses the information in these messages to configure its multicast-filtering hardware.

Provisioning

Each multicast connection in the network is distributed to a particular subset of rings in the network. A ring should be provisioned to get a copy of the traffic belonging to a multicast connection if one of the following conditions is true:
 1. A client who has requested this multicast connection is directly attached to that particular ring.
 2. A descendant of that particular ring must receive a copy of the multicast connection.

For example, with reference to FIG. 1, there are five rings in the network that need to receive traffic for a specific multicast connection. These rings include: the two layer #1 rings 14 and 15; the two middle layer #2 rings 17 and 19; and one layer #3 ring 23. Rings 19 and 23 need to receive a copy of the multicast traffic since they both have multicast group clients directly connected to them. Rings 14, 15 and 17 need to receive a copy of the multicast traffic because descendents of these three rings must receive a copy of the multicast traffic.

An assumption of the invention is that each multicast connection is transmitted over a different point-to-multipoint LSP. Utilizing the protection mechanism of the present invention, a protected point-to-multipoint LSP is provisioned for each multicast connection. A point to multipoint LSP is an LSP that enters each of the nodes in its path through a single port, but exits part of the nodes through multiple ports.

Each descendant ring is connected to its parent ring via two ports. One is defined as the primary port and the other is defined as the secondary port. The two ports may be either on the same physical device or on two different devices. If they are on the same device, the descendant ring is a single homing ring. If they are on different devices, the descendant ring is a dual homing ring.

Another assumption made is that each descendant ring is connected through two neighboring nodes, whereby the upstream node (i.e. the node that the packets arrive first at, when traveling along the primary LSP) contains the primary port, and the downstream node contains the secondary port for that ring.

Each multicast connection is built from two P2MP LSPs, a primary and a secondary LSP, whereby each protects the other. Each one of these two LSPs can be viewed logically as being built of a plurality of sub-LSPs, wherein a sub-LSP is a portion of the LSP running over the links of a specific ring. In accordance with the invention, within each ring, two sub-LSPs of each connection are provisioned as follows: one running in a clockwise direction and the other running in a counter-clockwise direction. One of these two sub-LSPs is termed the primary sub-LSP (or simply the primary LSP) and originates at the primary port. The other sub-LSP is termed the secondary sub-LSP (or simply the secondary LSP) and originates at the secondary port.

Figure 2:
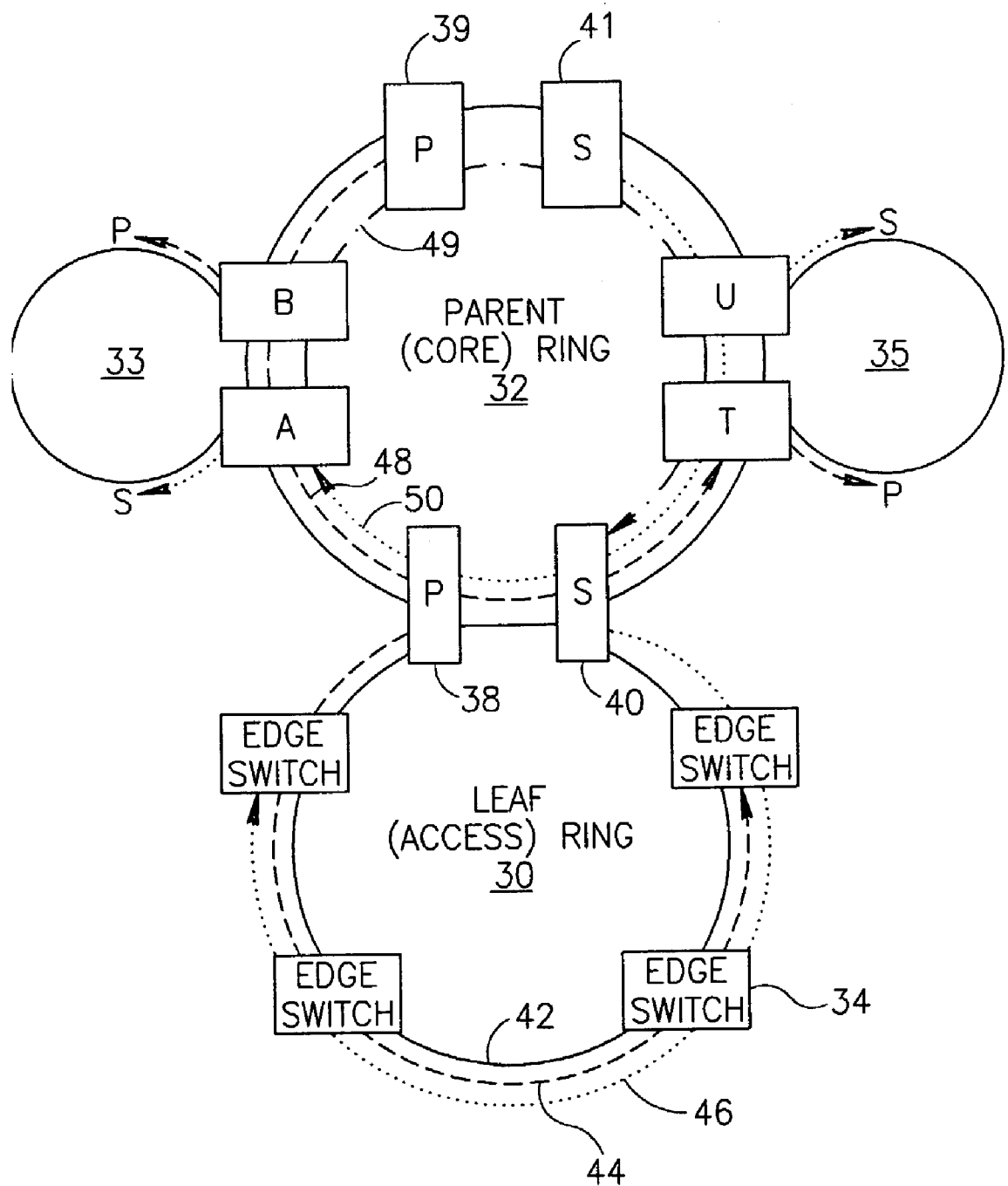
FIG. 2 is a diagram illustrating example parent (core) and leaf (access) rings wherein the leaf ring is constructed of edge switches.

A diagram illustrating example parent (core) and leaf (access) rings wherein the leaf ring is constructed of edge switches is shown in FIG. 2. This figure illustrates a parent ring 32 and a leaf (access) ring 30, which is a child (descendent) ring of parent ring 32, where the leaf ring is constructed from edge switches 34. The parent ring comprises a plurality of core switches including nodes P 38, S 40, A, B, P 39, S 41, U and T. Node P 38 is the primary node comprising the primary port and node S 40 is the secondary node comprising the secondary port interconnecting the parent ring 32 and child ring 30. Note that node P 39 and S 41 function as primary and secondary nodes for ring 32, connecting it to its own parent ring (not shown). In this case, the parent ring 32 serves as a child ring of that parent ring. Another possibility is that ring 32 is actually the root ring, i.e. the multicast source connects directly to node P 39.

The primary and secondary ports connect the descendant ring to its parent ring. The figure also illustrates the two sub-LSPs provisioned at each of the rings. In the parent ring, primary LSP 48 travels around the ring in the counterclockwise direction starting at the primary node leading from its own parent ring or from the directly attached multicast source and ending on the last node that is not shared with its own parent ring (or before that), while the secondary LSP 50 travels in the opposite direction. In the child ring, primary LSP 44 travels around the ring in the counterclockwise direction while the secondary LSP 46 travels in the opposite direction.

As part of the protection related provisioning, a protection tunnel is provisioned in each ring for which multicast protection is desired for each node in that ring through which the primary LSP traverses, from the node just upstream from (i.e. before) the node to be protected to the node just downstream from (i.e. after) the node to be protected in that ring. For example, consider node P 38 the node to be protected (protection is required in the event node P 38 or the link connecting nodes A and P 38 fails). In this example, the protection tunnel provisioned extends from node A to node S (represented by dotted-dashed line 49). The operation of the protection tunnel in the event of the failure is described in more detail infra.

Note that in an alternative embodiment, the protection tunnel actually begins at node P 38. In this case, the protection tunnel is adapted to have two entry points, one at node P 38 and one at node A. This serves to protect against partial failures of node P 38. An example of a partial failure is when a line card coupled to the link connecting nodes P and S fails. Communications remains intact between nodes P and A but data cannot pass to node S. In this case, the protection tunnel is activated with packets entering at node P rather than node A, since node A is typically not even aware of the failure on node P.

Note also that for each node to be protected, two protection tunnels are actually established. One protection tunnel runs in a clockwise direction while the other runs in a counterclockwise. The first (clockwise) tunnel is used for protecting connections for which the primary sub-LSP in that ring runs in a counterclockwise direction and the second (counterclockwise) tunnel is used for protecting connections for which the primary sub-LSP in that ring runs in a clockwise direction.

In addition, in accordance with the invention, node S is configured to forward packets exiting the protection tunnel to all secondary LSPs on all attached descendant rings for which node S is the secondary node and to continue a copy of the packet along the primary LSP of the parent ring, as well as to all descendant rings for which node S is the primary node (since a node may serve as both primary and a secondary node at the same time).

During normal operation of the network, multicast traffic flows only along the primary LSP of the connection in each of the rings that need to receive the packets of the connection. At nodes along the path in a parent ring that have one or more descendant rings attached thereto, a copy of each packet is forwarded onward along the primary sub-LSP of that parent ring while another copy of each packet is forwarded to each descendant ring where it continues along the primary sub-LSP of that descendant ring. Upon the occurrence of a failure, the secondary LSPs become operational in a portion of the rings, as explained in more detail hereinbelow.

Figure 5:
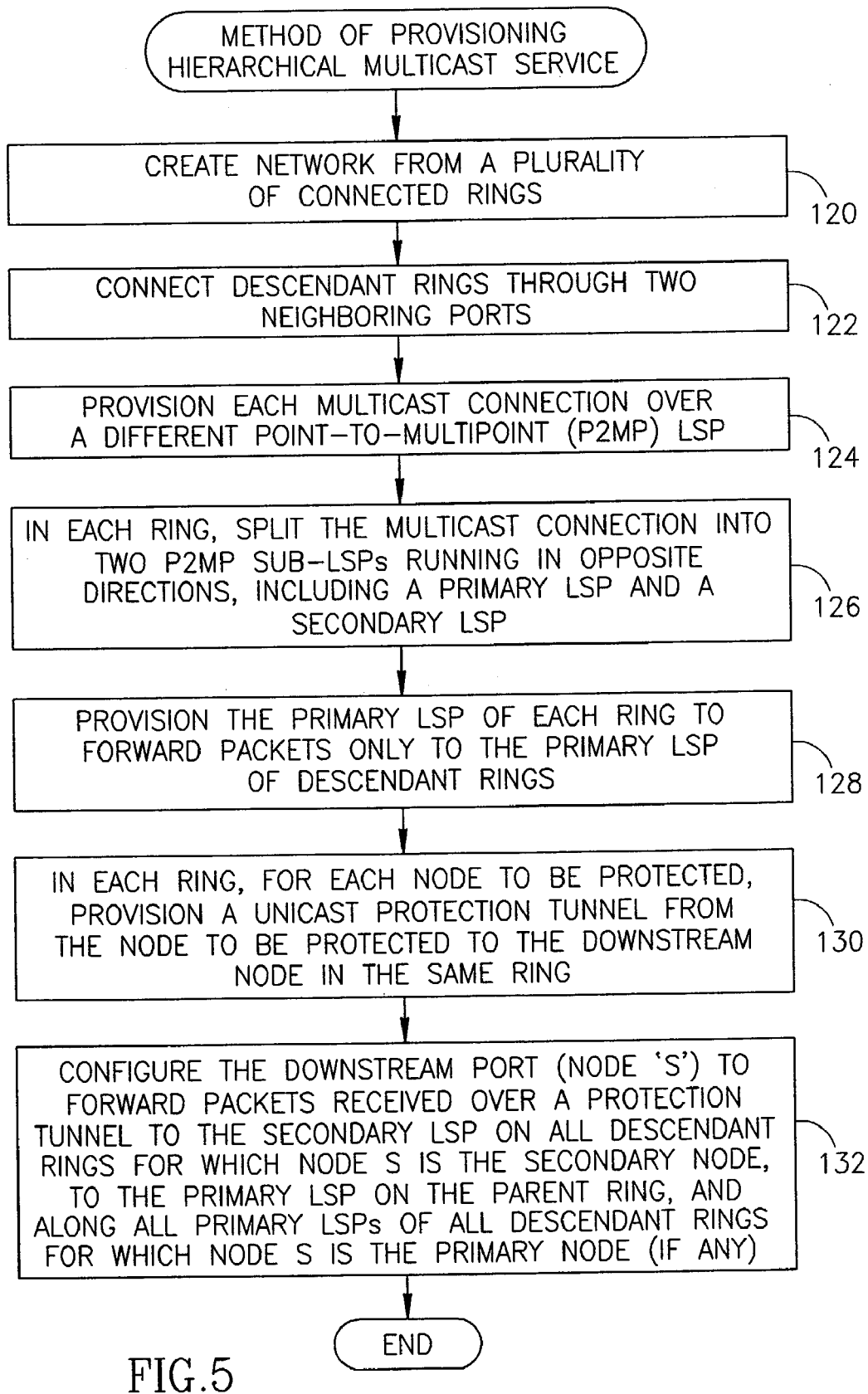
FIG. 5 is a flow diagram illustrating the method of provisioning hierarchical multicast service in accordance with the present invention.

The provisioning method is presented in flow chart form in FIG. 5. An assumption of the exemplary embodiment presented herein is that the network is created from a hierarchy of rings (step 120). The network is constructed by connecting rings in a hierarchical fashion, with parent rings connected to child rings via two neighboring ports (step 122). In accordance with the invention, each multicast connection is provisioned over a different point-to-multipoint LSP (step 124). For example, a single multicast server may host many multicast sources, each distributed over an individual P2MP LSP.

In each ring, the multicast connection is split into two point-to-multipoint sub-LSPs running in opposite directions (step 126). One sub-LSP is the primary LSP and the other sub-LSP is the secondary LSP. The primary LSP originates at the primary port and the secondary LSP originates at the secondary port. For each descendant ring, the primary port is the port connected to the node on one side of the descendant ring that is the first node the primary path visits, and the secondary port is the other port connecting that descendant ring to its parent ring.

The primary LSP of each ring is configured to forward packets during normal operation only to the primary LSP of descendant rings (step 128). The secondary LSP is used on a portion of the rings to carry multicast traffic in the event of a failure. In addition, in each ring, a point-to-point protection tunnel is provisioned to protect each node through which the primary sub-LSP passes. The protection tunnel for protecting a node P, for example, starts at the node upstream of node P along the primary LSP and ends at the node that is downstream of node P in the same ring (step 130). This protection tunnel used in the event of a failure to direct the multicast traffic around the failed link or node.

Finally, the node at which the tunnel ends (e.g., node S) is configured to forward packets received over the protection tunnel to the secondary LSPs on all descendant rings for which node S is the secondary node and also to continue the packet along the primary LSP of the parent ring as well as along all primary sub-LSPs of all descendant rings for which node S is the primary node (if any) (step 132).

Figure 3:
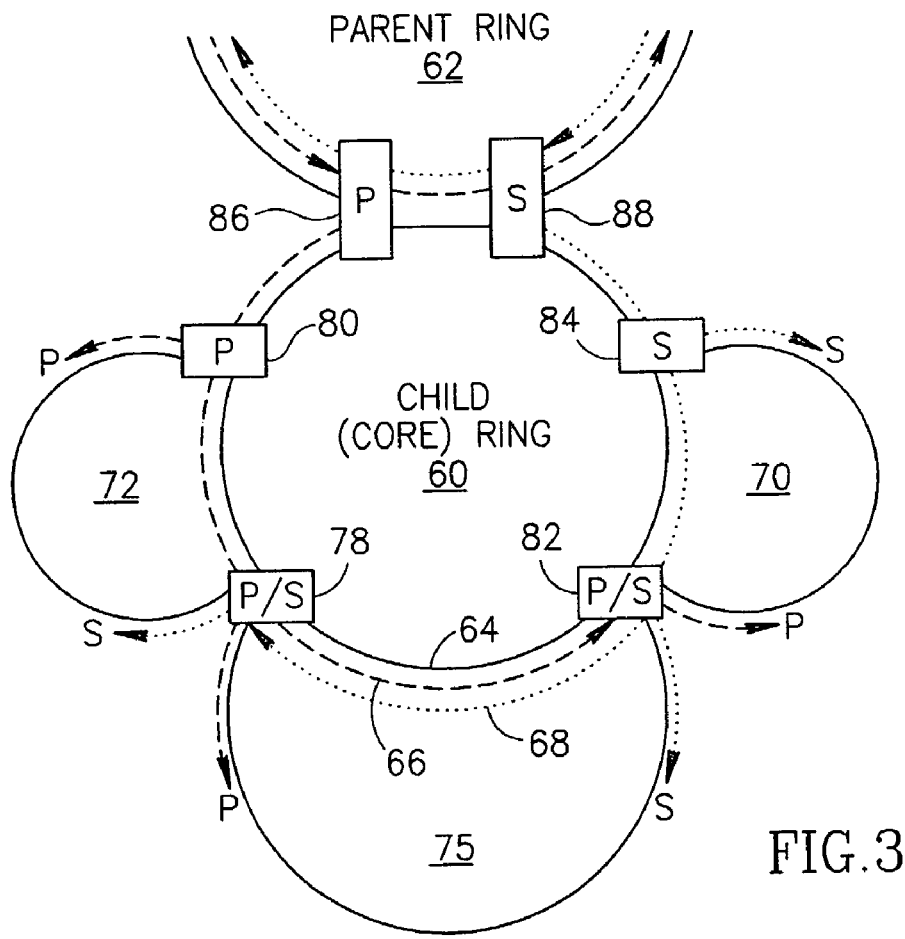
FIG. 3 is a diagram illustrating configuration of a core ring.

The configuration of core rings will now be described in more detail. A diagram illustrating configuration of a core ring is shown in FIG. 3. A core ring is defined as a ring that has no users directly connected to it, only child rings. In core rings, the primary and secondary sub-LSPs end at the node before last. The reason is that the first node in the ring contains only primary ports of child rings, and the last node in the ring contains only secondary ports of child rings.

With reference to FIG. 3, a portion of parent ring 62 is shown along with child core ring 60 comprising nodes 86, 80, 78, 82, 84 and 88. Node 86 is the primary node for ring 60 while node 88 is the secondary node for ring 60. Node 80 is also a primary node but for ring 72. Node 78 is a secondary node for child ring 72. Node 78, however, is also a primary for a child ring 75 connected via nodes 78 and 82. Node 82 also serves as both primary and secondary nodes. It serves as primary node for child ring 70 and as secondary node for child ring 75 connected via nodes 78 and 82. Note that the primary LSP 66 runs from primary node P 86 through nodes 80 and 78, ending at node P 82 (it does not need to get to node S 84) while the secondary LSP 68 runs from secondary node S 88 through nodes 84 and 82, ending at node S 78 (it does not need to get to node P 80).

Protection of Multicast Service

Figure 4:
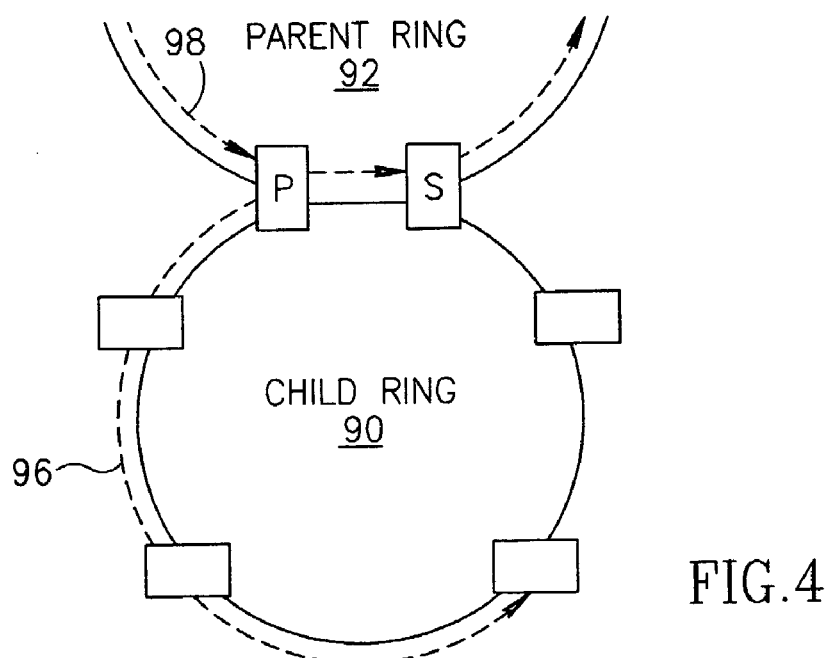
FIG. 4 is a diagram illustrating the normal traffic flow of the primary LSP from parent to child rings.

The present invention is operative to provide scalable protection for multicast service in a ring based network. As described supra, an assumption made is that each descendant ring is connected through two neighboring nodes, whereby the upstream node (i.e. the node that the packets arrive first at, when traveling along the primary LSP) contains the primary port, and the downstream node contains the secondary port for that ring. The primary LSP is provisioned to forward the packets only to the primary LSP of descendant rings. This is illustrated in FIG. 4 which shows the normal traffic flow of the primary LSP from parent to child rings.

Nodes S and P connect the parent ring 92 to the child ring 90. Absent a failure, multicast traffic flows along the primary LSP 98 of the parent ring. At node P, one copy of the packet is forwarded toward the primary LSP 96 of the child ring while another copy continues along the primary LSP 98 of the parent ring.

The operation of the protection mechanism in the event of a failure will now be described in more detail. In the event of a failure, the protection mechanism of the present invention is capable of providing protection in sub 50 ms times. Note that the fast protection mechanism described in U.S. Pat. No. 7,093,027 to Shabtay et al., entitled "FAST CONNECTION PROTECTION IN A VIRTUAL LOCAL AREA NETWORK BASED STACK ENVIRONMENT," incorporated herein by reference in its entirety, can be used in implementing the multicast protection mechanism of the present invention. Note also that during normal operation (no failure), the protection tunnels (including internal switch paths) are preferably not utilized for multicast traffic.

Figure 6:
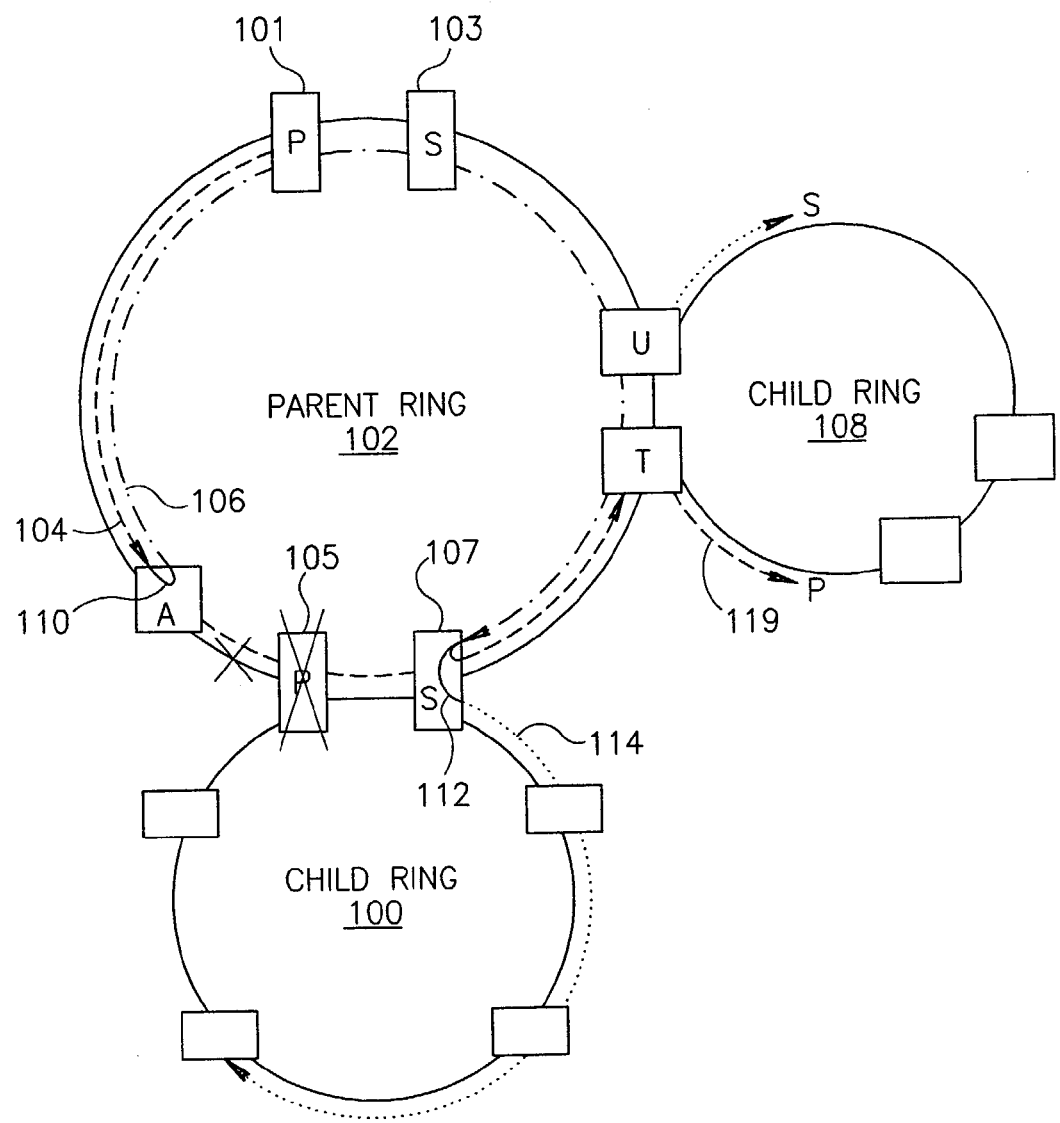
FIG. 6 is a diagram illustrating the multicast protection mechanism of the present invention and the resultant traffic flow in the event of a node or link failure from parent rings to descendant rings.

A diagram illustrating the multicast protection mechanism of the present invention and the resultant traffic flow in the event of a node or link failure from parent rings to descendant rings is shown in FIG. 6. In this example a parent ring 102 comprises nodes A, P 105, S 107, T, U, S 103 and P 101. The parent ring is connected to two child rings 100 and 108, each comprising a plurality of nodes. Child ring 100 is connected to the parent via the primary node P 105 and secondary node S 107. The primary LSP 104 travels counterclockwise around the ring from the primary node P 101 to node T. A secondary sub-LSP 114 (which is part of the secondary LSP originating at the root ring) originates at the secondary port on secondary node S 107 and travels clockwise (i.e. in a direction opposite to that of the primary LSP) around child ring 100. It is used only in the event of a failure as described below. Nodes T and U connect the parent ring 102 to child ring 108.

In accordance with the invention, a protection tunnel 106 is provisioned between node A and node S 107. In this example, the protection tunnel 106 protects node A against a failure of node P 105 or of the link connecting nodes A and P. In accordance with the present invention, any kind of failure in a node or a connecting link causes the activation of the protection tunnel protecting that node (for multicast traffic only). Packets are directed through the protection tunnel and upon exiting, continue along the primary LSP of the ring and all descendant rings for which node S is the primary node (none are shown in the Figure) and are also forwarded to the secondary LSPs of all descendant rings for which node S is the secondary node (i.e. secondary sub-LSP 114.

Referring to the example of FIG. 6, a failure of node P or the link connecting nodes A and P, causes all multicast traffic traveling on the primary LSP to be directed to the protection tunnel 106 that starts at node A (indicated by loop 110). The packets exit the protection tunnel at node S 107 and are forwarded to the secondary sub-LSP 114 of the child ring 100. In addition, the packets also continue along the primary sub-LSP 104 on the parent ring 102 (indicated by loops 112). Thus, the descendent rings receive a copy of the multicast traffic and, in addition, the packets are forwarded along the original primary sub-LSP of the parent ring. In this example, nodes T and U will receive a copy of the multicast traffic (as normal via primary sub-LSP 104) that is then sent over the child ring 108 via node T over the primary sub-LSP 119.

Note that a failure in the link leading to node P causes the same effect as the failure of node P, meaning that the packets are forwarded to the protection tunnel and never reach node P. When they arrive at node S, node S forwards them onward over the primary LSP and to the ports that are secondary to those starting at node P.

In the event of a card failure in node P, the behavior is the same as described above. In this case, node P sends the packets back along the ring using the same protection tunnel. This means that the protection tunnel is preferably extended during its provisioning to begin at the node it is protecting (i.e. which is node P in this case).

The behavior of the secondary port (i.e. node S) is configured during provisioning whereby the packets coming out of the protection tunnel have a label that is provisioned to cause node S to forward the packet to the secondary sub-LSPs on all descendant rings and also along the primary LSP starting at node S. Upon arrival at node S, the protection tunnel label is popped but the outer label is now the secondary LSP rather than the primary LSP. This label causes node S to copy the packet to both the secondary sub-LSPs on all descendent rings for which S is the secondary node and to the primary sub-LSP on the parent ring and on all descendant rings for which S is the primary node (none shown in the Figure).

The label stacking feature of the MPLS protocol is used for implementing bypass tunnel 106. At node A (or node P 105 in case of a partial failure in node P), the original outer label of the primary LSP is replaced with the special label defined above. The label of the protection tunnel is then pushed onto the stack and the packet is directed through the protection tunnel.

It is important to note that unlike the prior art where protection tunnels bring the packet back to the original LSP one or more hops after the failure, the protection mechanism of the present invention transports the packets to a completely different LSP at a different point in the network (as well as to the original LSP at that different point). In this manner, all the packets of all multicast trees passing through the same node coming from the same direction can be aggregated into a single point-to-point protection tunnel. The single point-to-point protection tunnel functions to carry the packets to the backup LSP (i.e. the secondary LSP). Note also that this protection mechanism is scalable in that any number of multicast connections may be aggregated through the same single point-to-point protection tunnel. A separate protection tunnel is required, however, for each node to be protected on a ring.

Note that the network may comprise many descendant rings connected to the parent ring via nodes P and S. Regardless of the number of child rings, however, all the multicast connection traffic going through the parent ring in the same direction is aggregated over the point-to-point protection tunnel. At the secondary node, each packet is forwarded over the appropriate secondary LSP on each of the child rings that are provisioned to receive packets of that connection.

Figure 7:
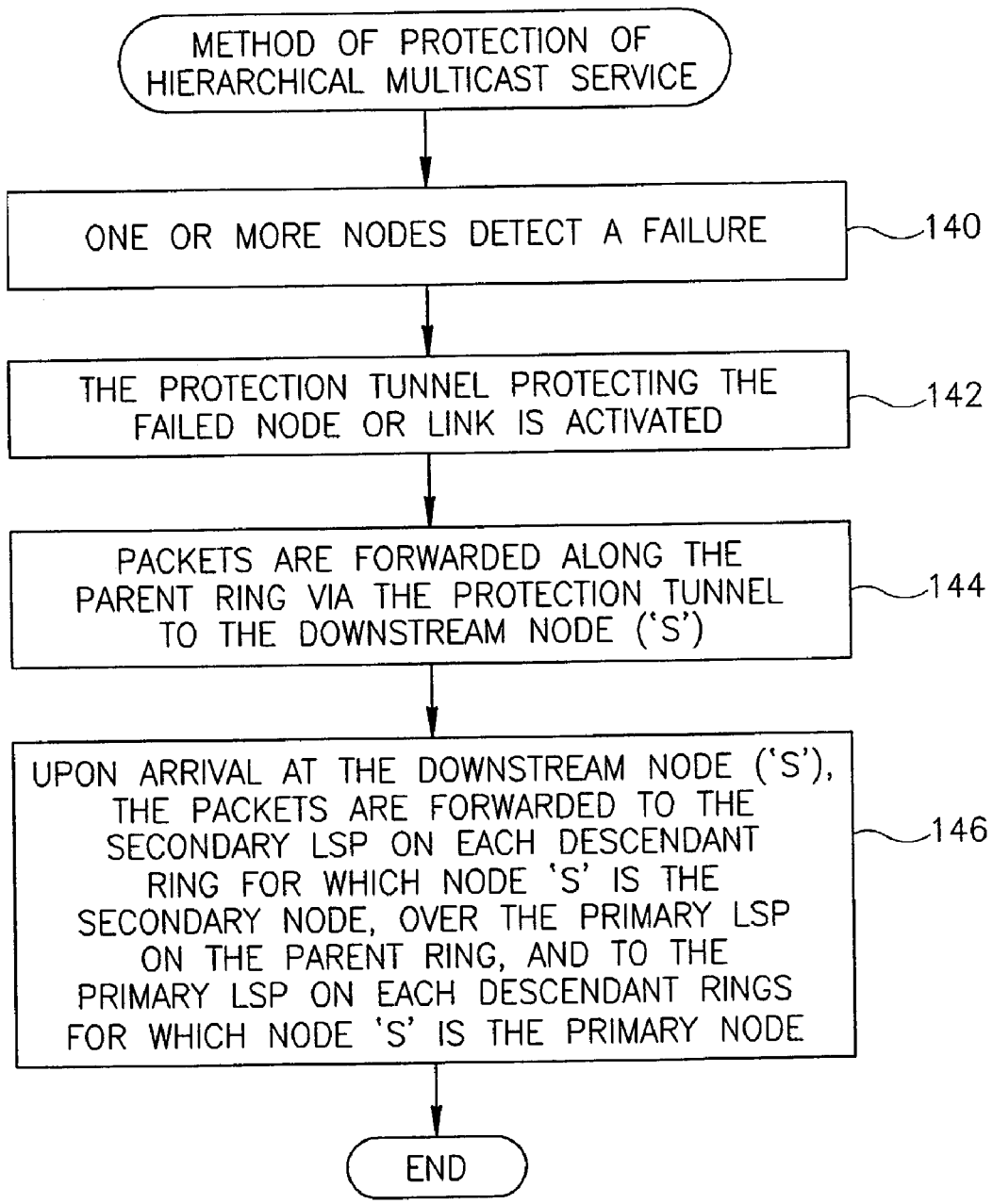
FIG. 7 is a flow diagram illustrating the method of protection of hierarchical multicast service in accordance with the present invention.

A flow diagram illustrating the method of protection of hierarchical multicast service in accordance with the present invention is shown in FIG. 7. Initially, one or more nodes detect the failure (step 140). The mechanism is the same regardless of the type of failure, e.g., node failure or link failure. The protection tunnel protecting the failed node or link is then activated in response to the failure (step 142). Packets are then forwarded along the parent ring through the protection tunnel to node S (step 144). At the end of the protection tunnel upon arrival at the secondary port, (1) a copy of the packet is forwarded to the secondary P2MP LSP on each of the descendant rings for which node S is the secondary node and (2) a copy of the packet continues over the primary LSP on the parent ring and (3) a copy is forwarded to the primary LSP on each of the descendant rings for which node S is the primary node (step 146).

Figure 8:
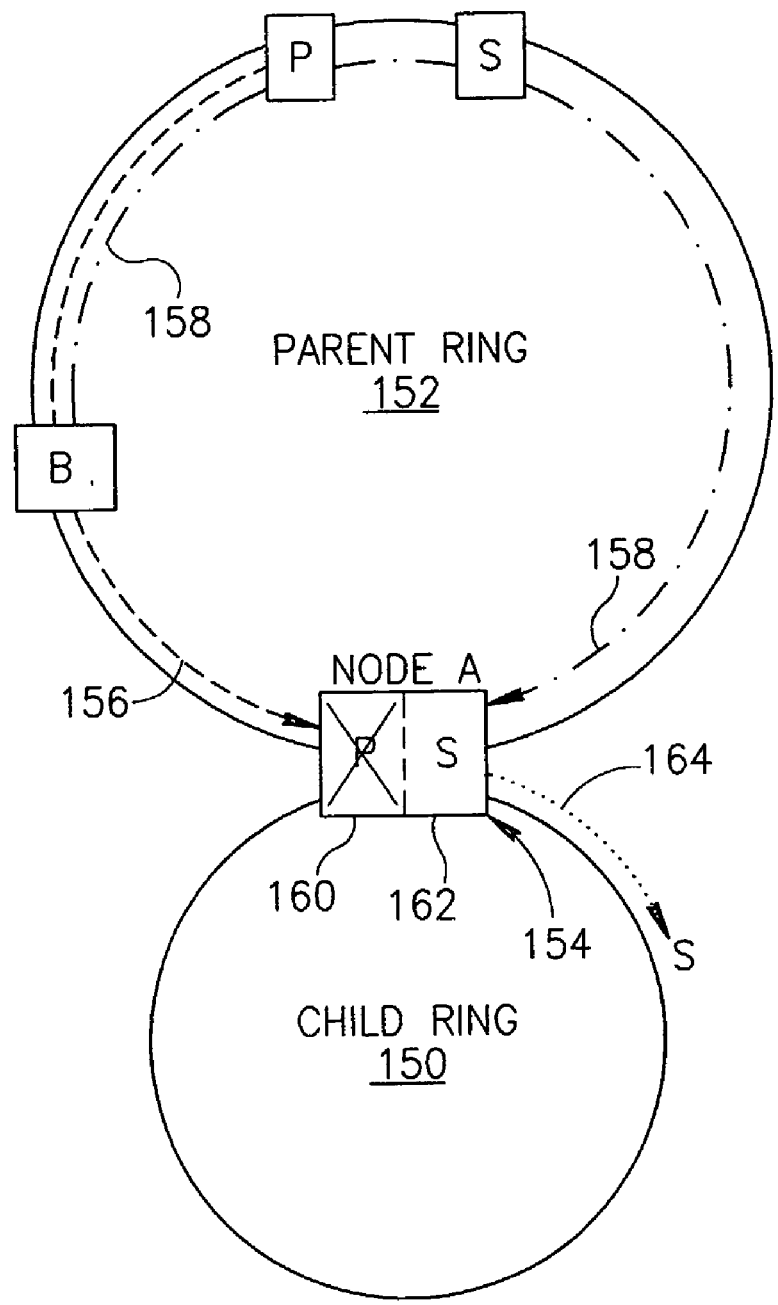
FIG. 8 is a diagram illustrating the multicast protection mechanism of the present invention operative in a ring having only a single physical node connected to each descendant ring connected to that node.

The multicast protection scheme described above can also work if some of the rings are connected to their parent ring through a single node. A diagram illustrating the multicast protection mechanism of the present invention operative in a ring having only a single physical node connected to a descendant ring is shown in FIG. 8. The parent ring 152 comprises a single physical node A that is logically divided into a logical node P 160 and a logical node S 162, primary LSP 156 and protection tunnel 158. The child ring 150 comprises secondary LSP 164.

The protection tunnel 158 for logical node P begins at node B and extends to node S. In this case, the multicast traffic sent through the protection tunnel 158 reaches the logical node S. From there, the traffic is forwarded to child rings through the secondary ports. Logically, however, node A is divided into two portions, P and S. Thus, the node A plays the role of both the primary and secondary nodes and ports. A failure of the link between nodes B and A is regarded as a failure of the P portion of node A. Similarly, a partial failure in A of the resources (e.g., any of its circuit cards, etc.) that serve the primary path is regarded as a failure of the P portion of node A. Note that preferably, the operator or network administrator should insure as much as possible that resources within node A do not serve both the primary path as well as the secondary path. Thus, the resources within the node should be segregated as much as possible in terms of which path they serve.

Figure 9:
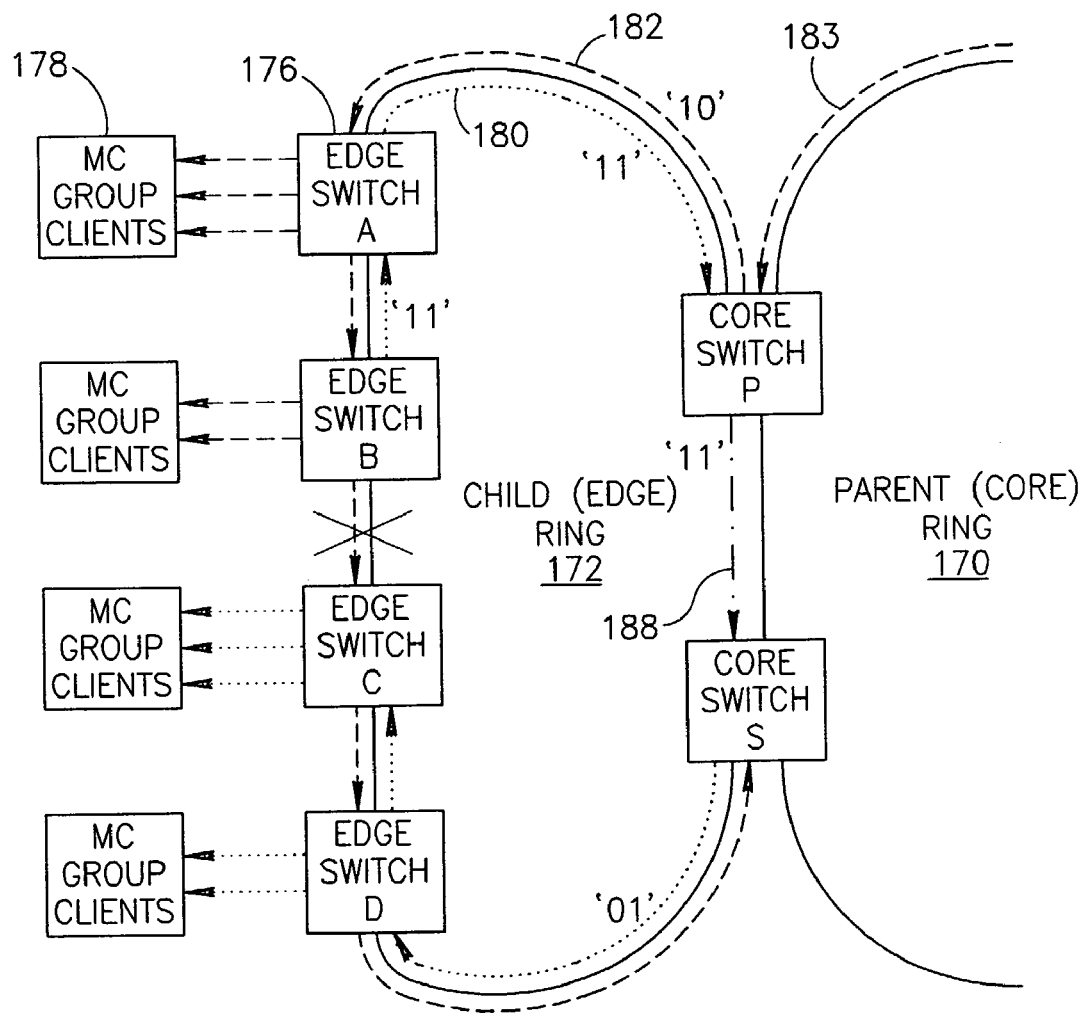
FIG. 9 is a diagram illustrating the multicast protection mechanism of the present invention operative in edge device based rings.

As described supra, the multicast protection mechanism of the present invention is also applicable to edge switch based rings. A diagram illustrating the multicast protection mechanism of the present invention operative in edge device based rings is shown in FIG. 9. Parent (core) ring 170 (shown partially) comprises core switch P 174, core switch S and primary LSP 183. The child (edge) ring 172 comprises a plurality of edge switches 176 labeled A, B, C and D, primary LSP 182 and secondary LSP 180. The edge switches connected to each other as shown are termed an edge switch stack. The stack is connected to the core network only the ends of the stack. The edge switches are connected to multicast group clients 178. A first protection tunnel runs from node P to node S. A second protection tunnel runs from node S to node P and serves connections for which the primary sub-LSP proceeds in the direction from node S to node P. Normally, multicast packets arriving over the primary LSP 183 to node P are forwarded over the primary LSP 182 of the child (edge) ring 172 to the switches in the stack. Note that LSP 183 may also continue along the parent ring.

Each switch within the stack is connected to the switch above and below it through the network ports. The switches on the two ends of the stack are connected to neighboring switches through a network port and to core switches through a different network port. The edge switches may comprise the A-2100 Optical Ethernet Edge Switch manufactured by Atrica Inc., Santa Clara, Calif. The core switches may comprise, for example, A-8100 or A-8800 Optical Ethernet core switches manufactured by Atrica Inc., Santa Clara, Calif. The core switches are MPLS based switches that use MPLS technology at their core ports for connection to neighboring core switches and use VLAN technology at their network edge ports that are the ports to which the end edge switches in the stack are connected.

When a link in the stack fails (such as the link connecting nodes B and C), the edge switch that sensed the failure is operative to forward the multicast packets received on the primary LSP to the user ports (i.e. only to those clients that requested the specific multicast group, if any) as well as to return the packets back over the stack in the same fashion as would be done with point-to-point unicast connections.

The packets sent back towards the core switch, however, are not forwarded to the user ports by edge switches along the way. The packet processing hardware with the edge switches comprises fast acting circuitry adapted to identify these packets according to indications within the packet. Two indications are used. The first indication is an 'alternative path' indication (i.e. bits or flags) used to indicate that the packet is being forwarded over an alternative path. The second indication is a 'primary path' indication (e.g., bit or flag) used to indicate that the packet was originally sent by a primary node over a primary path.

Each packet received by node P over the MPLS network is forwarded to the VLAN based edge switch stack with the alternative-path bit cleared and the primary path bit set (to indicate that the packet was originally sent by the core switch over the main or primary VLAN). Note that the setting of the two bits is indicated in the figure as '10' (bit 0 representing the alternative-path bit and bit 1 representing the primary path bit. In the event of a failure, the packets are sent back along the alternative VLAN with both the alternative-path and primary path bits set (indicated by '11'). The packets are received by node P which then forwards them to the other side of the stack using the edge protection tunnel 188. At the end of the tunnel at node S, the packets are then sent to the stack over the alternative VLAN (dotted lines) with the 'primary path' bit cleared and the alternative-path bit set (indicated by '01'). The packets are then forwarded at each edge switch to the requesting user ports as well as to the next edge switch in the stack.

Thus, edge switches in the stack that receive packets with both indication bits set, know that the packet is not to be forwarded to users. On the other hand, if only one of the two bits is set, the packet is forwarded to users.

Interaction with the Multicast Sources

The core switches to which the multicast source is connected preferably have the capability of mapping different IP-multicast groups to the different multicast connections. The mapping may be a one-to-one mapping or a many-to-one mapping (i.e. the same connection serves a number of multicast-groups). The mapping can be performed either by mapping means within the core switch to map according to the destination IP-address or by means for mapping in the core switch to map according to the VLAN. For example, most video servers use different IP destination addresses for different channels to be distributed. In the case of VLAN-based mapping, the multicast source is required to tag packets of different multicast-groups with the different VLAN IDs.

The root of the tree for a specific multicast connection is the ring to which the multicast source of that connection is connected. At that ring, the provisioning originates the primary path at the multicast source. The secondary path is not required to be provision at that ring. Upon the occurrence of a failure, the protection tunnel is used on that ring to transport the multicast traffic to the secondary sub-trees that start on the descendant rings.

Multicast Server Attachment Points

Figure 10:
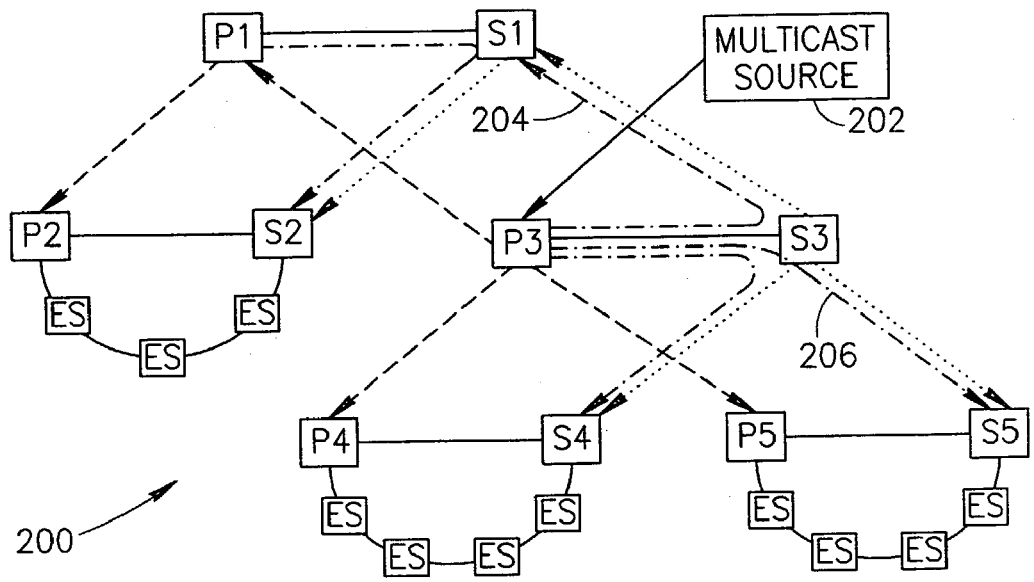
FIG. 10 is a diagram illustrating a first example network having a multicast source connected to a node in the network.
Figure 11:
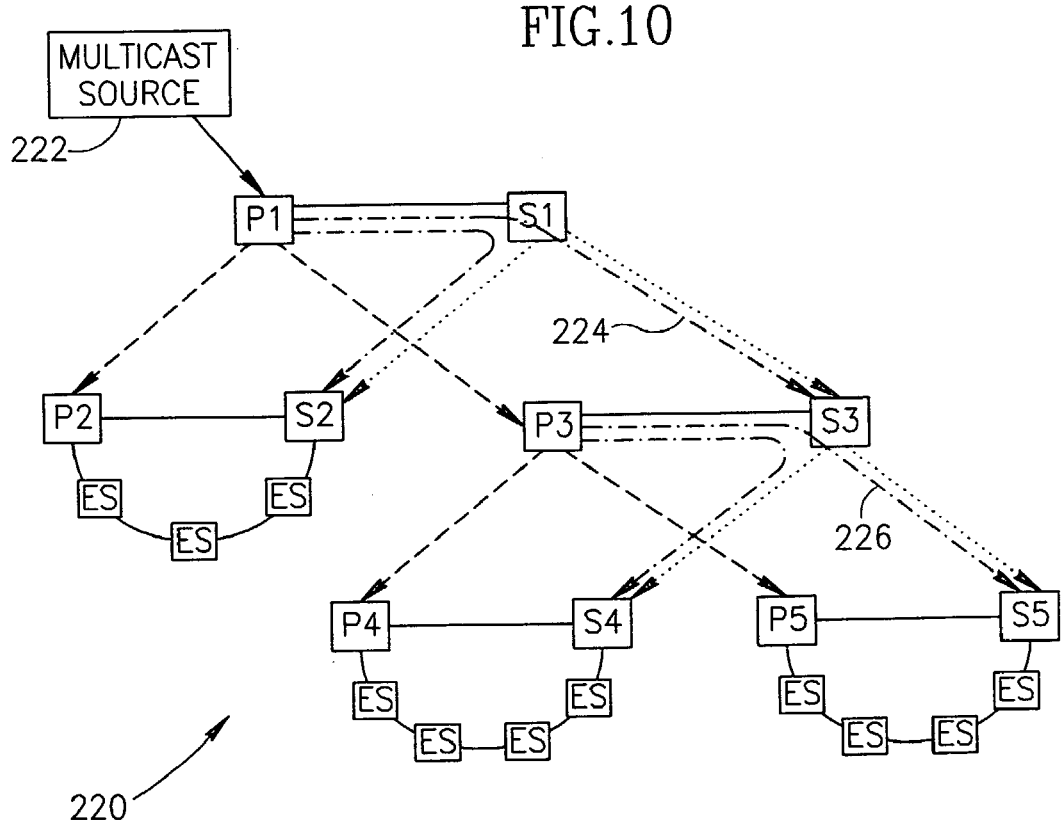
FIG. 11 is a diagram illustrating a second example network having a multicast source connected to a node in the network.

As described hereinabove, a multicast source may be attached to any node (e.g., core or edge) in the network. Two example networks having a multicast source connected to different nodes in the network are shown in FIGS. 10 and 11. In both figures, communication links are indicated by solid black lines, primary paths by dashed lines, secondary paths by dotted lines and protection tunnels by dashed/dotted lines. Note that for clarity sake, not all communication links between nodes are shown.

When attached to a core switch in a core ring, this node automatically becomes the root for the specific multicast connections starting at this particular multicast source. In other words, different nodes can act as the root of different multicast trees that are allocated for different multicast connections. In addition, the multicast connections starting at different roots are directed to different protection tunnels, according to the direction of the tree for the specific multicast connection.

When attached to an edge switch in an access ring, a video server is connected to the two core switches at the two sides of that access ring using a protected connection along the stack. The protected connection forwards the packets to one of the core switches (which acts as the primary node for that connection) and also forwards the packets to the other core switch device in case there is a failure in the stack or in case the primary core switch fails. When the packets arrive at one of the two core switches, they proceed from there to all clients as described above.

With reference to FIG. 11, the example network, generally referenced 220, comprises a plurality of nodes consisting of core switches and edge switches and a multicast source 222 attached to node P1. Here too, several protection tunnels are shown. For example, protection tunnel 224 is operative to protect node P3. In the event the primary path from node P1 to node P3 fails, multicast traffic is directed through the protection tunnel 224 to the secondary node S3 where it is distributed over secondary paths to nodes S4 and S5. Similarly, protection tunnel 226 is operative to protect node P5. In the event the primary path from node P3 to node P5 fails, multicast traffic is directed through the protection tunnel 226 to the secondary node S5 where it is distributed to the child access ring.

It is important to note that the two different multicast distribution trees illustrated in FIGS. 10 and 11 may exist simultaneously in the same network in parallel, each distribution tree servicing a multicast for which the source is attached to the network at a different point.

Network Device Embodiment

A network device can be adapted to implement the fast protection mechanism of the present invention. Hardware means and/or software means adapted to execute the mechanism may be incorporated within a network device such as a core switch, edge switch, Network Management System, Label Switching Router (LSR), network switch or any other wired or wireless network device. The device may be constructed using any combination of hardware and/or software.

Figure 12:
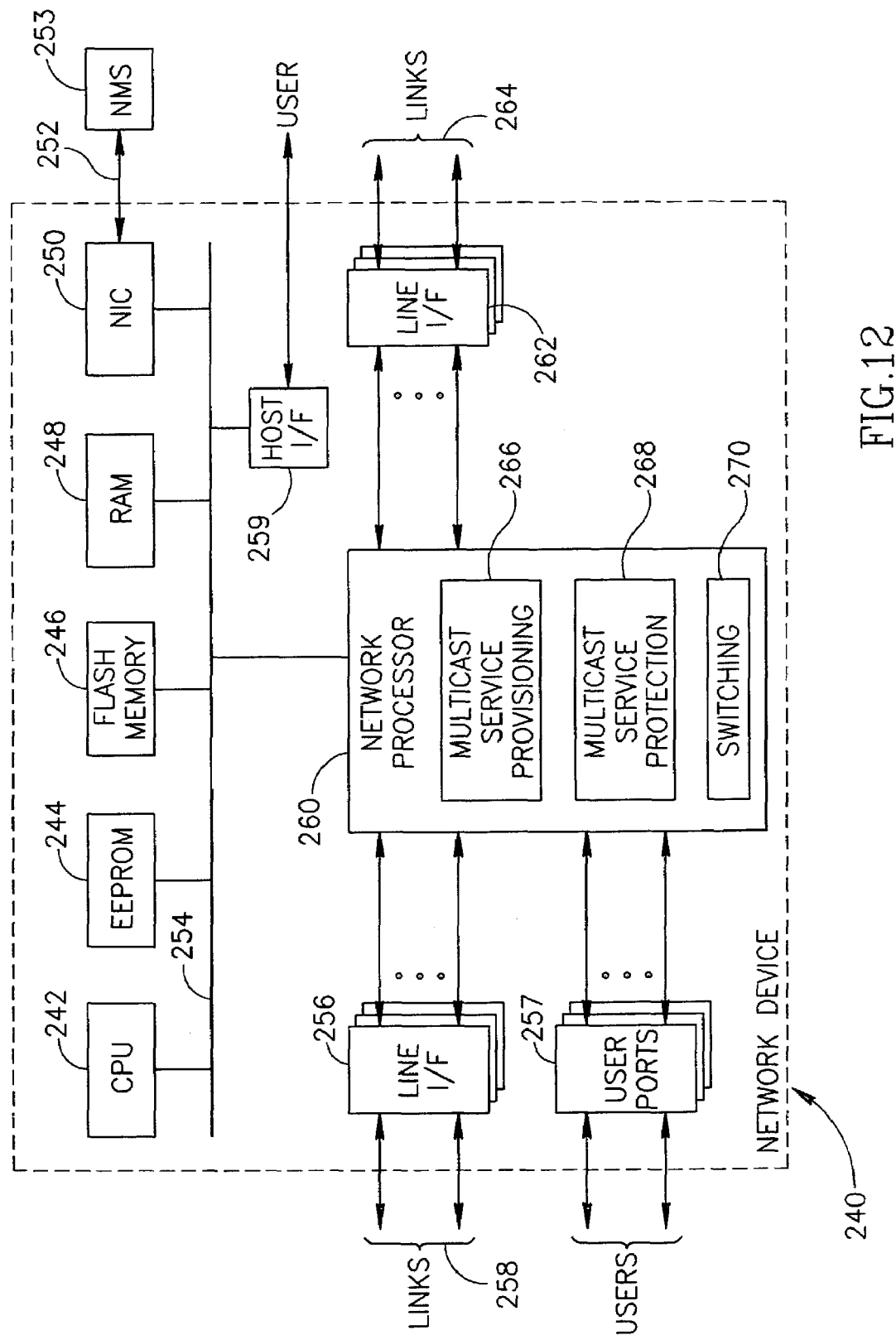
FIG. 12 is a block diagram illustrating an example network switch incorporating the hierarchical multicast protection mechanism of the present invention.

A block diagram illustrating an example network device incorporating the multicast protection mechanism of the present invention is shown in FIG. 12. The network device, generally referenced 240, comprises at its core a network processor 260, link interface cards 256, 262, a network interface 252 for interfacing the network device to an NMS 253, a central processor 242, e.g., CPU, and both volatile and non-volatile memory including RAM memory 248 for storing data and application program code, Flash memory 246 for storing boot and application code and EEPROM 244 for storing configuration data. The CPU communicates to the network processor, memory peripherals and other support devices via a bus 254.

The one or more line interface cards 256, 262 provide the PHY interface to two way communication links 258, 264, respectively. As an example, the interface cards may be adapted to interface to any combination of the following communication links: any variety of copper or optical based Ethernet, Token Ring, FDDI, SONET/SDH, ATM, RPR.

In the case where the network device is implemented as an edge switch, the network device comprises a user side and a network side. A plurality of user ports 257 are provided for connecting to a plurality of users. The user side interfaces to the user via any suitable type of interface, e.g., Gigabit Ethernet (GE), Fast Ethernet (FE), PDH interface (e.g., T1/E1), etc. Likewise, the network side interfaces to other edge switches or the core network via any suitable interface such as Optical Ethernet (e.g., 1 GE, 10 GE, etc.), TDM, RPR, etc. A plurality of edge switches may be connected to each other to form a stack whereby the edge switches at the ends of the stack are connected to core switches. In this case, connections may be built using both VLAN and MPLS based technology. Alternatively, the network may comprise only edge switches whereby a plurality of edge switches are connected in a ring topology.

The network processor 260 implements the switching fabric (switching block 270) for providing the switching functionality of the device. Depending on the specific implementation, the switching fabric may comprise, for example, hardware for performing VLAN tagging, MPLS, Frame Relay, ATM switching, CSIX or any other fabric to network interface protocol. The network processor includes one or more packet processing engines that comprises an ingress packet processor and an egress packet processor (not shown). The network processor also comprises timestamp circuits, clock circuits, memory, counters and CPU interface (not shown). A multicast service provisioning block 266 and multicast service protection block 268 within the network processor are operative to implement the multicast protection mechanism of the present invention as described hereinabove. The network processor may be implemented as a microcontroller, microprocessor, microcomputer, ASIC core, FPGA core, central processing unit (CPU) or digital signal processor (DSP) or any other suitable computing means.

The network device also comprises a NIC 250 for providing an out of band interface for connecting to external entities such as a craft for local maintenance and configuration purposes, a NMS for centralized provisioning, administration and control or a Local Area Network (LAN). The network device may comprise additional interfaces, such as a serial interface for connecting to a PC for configuration purposes.

The central processor 242 implements the major functionality of the network device. Note that the central processor may be implemented in any suitable manner such as a microcontroller, microprocessor, microcomputer, ASIC core, FPGA core, central processing unit (CPU) or digital signal processor (DSP) or any other computing means.

The user ports and network ports may be implemented on one or more line interface cards that provide the PHY interface to bidirectional communication links, optionally to the MAC interface. Note that the invention is not limited to any particular line interface type or link speed. In addition, the invention is not limited to any particular number of user or network ports, as any number of links of each type may be used. Further, the line interface cards may be adapted to interface to any type of communication links such as any variety of copper or optical based Ethernet, Token Ring, FDDI, SONET/SDH, PDH, ATM, RPR, etc.

The network device also comprises an optional user interface adapted to respond to user inputs and provide feedback and other status information. A host interface 259 enables communication with a host computing device. The host may be adapted to configure, control and maintain the operation of the device. The device may also comprise magnetic storage device means for storing application programs and data.

The network device comprises computer readable storage medium for storing program code and data which may include any suitable memory means including but not limited to magnetic storage, optical storage, CD-ROM drive, ZIP drive, DVD drive, DAT cassette, semiconductor based volatile or non-volatile memory, biological memory devices, or any other memory storage device.

Software operative to implement the functionality of the multicast protection mechanism of the present invention is adapted to reside on a computer readable medium, such as a magnetic disk within a disk drive unit or any other volatile or nonvolatile memory. Alternatively, the computer readable medium may comprise a floppy disk, Flash memory, EPROM, EEPROM based memory, bubble memory storage, ROM storage, etc. The software adapted to perform the multicast protection mechanism of the present invention or any portion thereof may also reside, in whole or in part, in the static or dynamic main memories or in firmware within the processor of the switch (i.e. within microcontroller, microprocessor, microcomputer, DSP, etc. internal memory).

In alternative embodiments, the methods of the present invention may be applicable to implementations of the invention in integrated circuits, field programmable gate arrays (FPGAs), chip sets or application specific integrated circuits (ASICs), DSP circuits, wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of providing multicast service protection in a hierarchical ring based network, said method comprising the steps of:

provisioning a protected multicast connection as two Label Switched Paths (LSPs) including a primary point-to-multipoint (P2MP) LSP comprising a primary sub-LSP in each ring traversed by the connection and originating at a primary port, and a secondary P2MP LSP comprising a secondary sub-LSP in each ring traversed by the connection and originating at a secondary port, wherein said secondary sub-LSP travels in a direction opposite to that of said primary sub-LSP;

in each ring of said protected multicast connection, provisioning at least one point-to-point (P2P) protection tunnel in one or both directions for each node to be protected, said P2P protection tunnel starting at a neighboring node upstream of said node to be protected and ending at a neighboring node downstream of said node to be protected; and in the event of a failure of a link or node, directing packets over said P2P protection tunnel, wherein packets are transported to a different LSP, including secondary LSPs on descendant rings for which the downstream node is the secondary node and to the primary LSP on descendant rings for which the downstream node is the primary node.

2. The method according to claim 1, wherein packets received over said protection tunnel are forwarded to the primary LSP on a parent ring.

3. The method according to claim 1, wherein said primary port and said secondary port are located on two neighboring nodes.

4. The method according to claim 1, wherein said primary port and said secondary port are located on the same node.

5. The method according to claim 1, wherein said primary port and said secondary port of a descendant ring are located on two neighboring nodes.

6. The method according to claim 1, wherein said primary port and said secondary port of a descendant ring are located on the same node.

7. The method according to claim 1, wherein said ring based network comprises a Multiprotocol Label Switching Protocol (MPLS) network.

8. The method according to claim 1, wherein said step of directing packets comprises the steps of:

replacing a primary LSP label with a secondary LSP label; and pushing a protection tunnel label onto a Multiprotocol Label Switching Protocol (MPLS) stack of each packet before being directed over said protection tunnel.

9. The method according to claim 1, wherein said step of directing packets comprises the steps of:

replacing a primary LSP label with a label provisioned at the downstream neighboring node such that packets with that label are forwarded along the secondary LSP in all descendant rings for which node the downstream neighboring node is the secondary node and along the primary LSP in all descendant rings for which node the downstream neighboring node is the primary node and along the parent ring; and pushing a protection tunnel label onto a Multiprotocol Label Switching Protocol (MPLS) stack of each packet before being directed over said protection tunnel.

10. The method according to claim 1, wherein each said point-to-point protection tunnel is adapted to protect a plurality of LSPs.

11. The method according to claim 1, adapted to be implemented using one or more Application Specific Integrated Circuits (ASICs).

12. The method according to claim 1, adapted to be implemented using one or more Field Programmable Gate Array (FPGA) integrated circuits.

13. A method of provisioning a protected hierarchical multicast service in a ring based network, said method comprising the steps of:

creating a primary point-to-multipoint (P2MP) Label Switched Path (LSP) by provisioning in each ring of a protected multicast connection a primary sub-LSP originating at an upstream primary port;

creating a secondary P2MP Label Switched Path (LSP) by provisioning in each ring of said protected multicast connection a secondary sub-LSP originating at a secondary port, which is downstream in the parent ring and traveling in a direction opposite to that of said primary LSP;

in each ring of said protected multicast connection, provisioning at least one point-to-point (P2P) protection tunnel in one or both directions for each node to be protected, said P2P protection tunnel starting at a neighboring node upstream to said node to be protected and ending at a neighboring node downstream to said node to be protected; and configuring said downstream neighboring node such that in the event of a failure of a link or node, packets are transported to a different LSP, including secondary LSPs on all descendent rings for which said downstream neighboring node comprises either a primary or a secondary port thereof and to the primary LSP on the parent ring.

14. The method according to claim 13, wherein said primary port and said secondary port are located on two neighboring nodes.

15. The method according to claim 13, wherein said primary port and said secondary port are located on the same node.

16. The method according to claim 13, wherein said primary port and said secondary port of a descendant ring are located on two neighboring nodes.

17. The method according to claim 13, wherein said primary port and said secondary port of a descendant ring are located on the same node.

18. The method according to claim 13, wherein said step of configuring comprises the steps of:

first configuring the node at which said protection tunnel terminates with a first label such that packets with said first label are forwarded to all descendant rings for which this node contains their secondary ports and to all descendant rings for which this node contains their primary port; and second configuring nodes that inject traffic into said protection tunnel to change the outer label of packets to said first label, and to push a protection tunnel label onto a Multiprotocol Label Switching Protocol (MPLS) stack of each packet before being directed over said protection tunnel.

19. The method according to claim 18, wherein said first step of configuring further comprises configuring said protection tunnel such that packets with said first label are forwarded along the continuation of the primary LSP in the parent ring to which the node belongs.

20. The method according to claim 13, wherein said ring based network comprises a Multiprotocol Label Switching Protocol (MPLS) network.

21. The method according to claim 13, wherein each said point-to-point protection tunnel is adapted to protect a plurality of LSPs.

22. The method according to claim 13, adapted to be implemented using one or more Application Specific Integrated Circuits (ASICs).

23. The method according to claim 13, adapted to be implemented using one or more Field Programmable Gate Array (FPGA) integrated circuits.

24. A method of protecting hierarchical multicast service in a ring based network, said method comprising the steps of:

splitting a multicast connection into a primary point-to-multipoint (P2MP) Label Switched Path (LSP) comprising a plurality of primary sub-LSPs, and a secondary P2MP LSP comprising a plurality of secondary sub-LSPs, a primary sub-LSP and secondary sub-LSP established on each ring traversed by said protected multicast connection, said primary sub-LSP originating on a primary node and said secondary sub-LSP originating on a secondary node and traveling in a direction opposite to that of said primary sub-LSP, said secondary sub-LSP serving as protection for said primary sub-LSP; and in the event of a failure, directing all primary LSP traffic on a parent ring through a point-to-point protection tunnel on said parent ring to a first node, wherein packets are transported to a different LSP, including secondary LSPs on all descendent rings for which said first node is a secondary node and to the primary LSP on all descendant rings for which said first node is a primary node.

25. The method according to claim 24, wherein a protection tunnel is provisioned for each node to be protected and comprises entry points in a neighboring node upstream of said node to be protected and ends at a neighboring node downstream of said node to be protected.

26. The method according to claim 24, further comprising the step of duplicating traffic arriving at the end of said protection tunnel on said parent ring for continuation over said primary LSP on said parent ring.

27. The method according to claim 24, wherein said primary node and said secondary node comprise two separate physical neighboring nodes.

28. The method according to claim 24, wherein said primary node and said secondary node are logical nodes physically located on the same node.

29. The method according to claim 24, wherein said step of directing comprises the steps of:

replacing a primary LSP label with a label provisioned at the downstream neighboring node such that packets with that label are forwarded along the secondary LSP in all descendant rings for which node the downstream neighboring node is the secondary node and along the primary LSP in all descendant rings for which node the downstream neighboring node is the primary node and along the parent ring; and pushing a protection tunnel label onto a Multiprotocol Label Switching Protocol (MPLS) label stack of each packet before being directed over said protection tunnel.

30. The method according to claim 24, wherein said step of transporting comprises the steps of:

popping a label of said point-to-point protection tunnel from a Multiprotocol Label Switching Protocol (MPLS) stack of each packet; and forwarding received packets in accordance with the outer label to secondary LSPs on all descendent rings for which said first node is the secondary node and to the primary LSP on all descendant rings for which said first node is the primary node.

31. The method according to claim 24, wherein said ring based network comprises a Multiprotocol Label Switching Protocol (MPLS) network.

32. The method according to claim 24, wherein each said point-to-point protection tunnel is adapted to protect a plurality of P2MP LSPs.

33. The method according to claim 24, adapted to be implemented in one or more Application Specific Integrated Circuits (ASICs).

34. The method according to claim 24, adapted to be implemented in one or more Field Programmable Gate Array (FPGA) integrated circuits.

35. A system for protecting hierarchical multicast service in a ring based network, comprising:
- means for splitting said multicast connection into a primary point-to-multipoint (P2MP) Label Switched Path (LSP) comprising a plurality of primary sub-LSPs, and a secondary P2MP LSP comprising a plurality of secondary sub-LSPs, a primary sub-LSP and secondary sub-LSP established on each ring said protected multicast connection traverses, said primary sub-LSP originating on a primary node and said secondary sub-LSP originating on a secondary node and traveling in a direction opposite to that of said primary sub-LSP, said secondary sub-LSP serving as protection for said primary sub-LSP; and
- means for directing all primary LSP traffic on a parent ring through a point-to-point protection tunnel on said parent ring to a first node in the event of a failure, wherein packets are transported to a different LSP, including secondary LSPs on all descendent rings for which said first node is a secondary node and to the primary LSP on all descendant rings for which said first node is a primary node.

36. The system according to claim 35, wherein said means for transporting is operative to forward traffic arriving at the end of said protection tunnel at said first node along the original LSP on said parent ring.

37. A network switch, comprising:
- a plurality of ports for interfacing said network switch to one or more communication links;
- a network processor;
- software means adapted to be executed by said network processor and operative to:
  - provide support for splitting said multicast connection into a primary point-to-multipoint (P2MP) Label Switched Path (LSP) comprising a plurality of primary sub-LSPs, and a secondary P2MP LSP comprising a plurality of secondary sub-LSPs, a primary sub-LSP and secondary sub-LSP established on each ring said protected multicast connection traverses, said primary sub-LSP originating on a primary node and said secondary sub-LSP originating on a secondary node and traveling in a direction opposite to that of said primary sub-LSP, said secondary sub-LSP serving as protection for said primary sub-LSP; and
  - provide support for directing all primary LSP traffic on a parent ring through a point-to-point protection tunnel on said parent ring in the event of a failure, wherein packets are transported to a different LSP, including secondary LSPs on all descendent rings for which said first node is a secondary node and to the primary LSP on all descendant rings for which said first node is a primary node.

38. The network switch according to claim 37, wherein said network switch comprises an edge switch.

39. The network switch according to claim 37, wherein said network switch comprises a core switch.

40. The network switch according to claim 37, wherein said plurality of ports is adapted to interface said network switch to one or more users.

41. The network switch according to claim 37, wherein said software means is adapted to provide support for forwarding said traffic arriving at the end of said protection tunnel towards the continuation of said parent ring.

42. The network switch according to claim 37, wherein said software means comprises:
- means for replacing a primary LSP label with a label provisioned at the downstream neighboring node such that packets with that label are forwarded along the secondary LSP in all descendent rings for which node the downstream neighboring node is the secondary node and along the primary LSP in all descendent rings for which node the downstream neighboring node is the primary node and along the parent ring; and
- means for pushing a protection tunnel label onto a Multiprotocol Label Switching Protocol (MPLS) stack of each packet before being directed over said protection tunnel.

43. The network switch according to claim 37, wherein said software means comprises:
- means for popping a label of said point-to-point protection tunnel from a Multiprotocol Label Switching Protocol (MPLS) label stack of each packet; and
- means for forwarding received packets in accordance with the outer label to secondary LSPs on all descendent rings for which said first node is the secondary node and to the primary LSP on all descendant rings for which said first is the primary node.

44. The network switch according to claim 37, wherein said network processor is adapted to be implemented in one or more Application Specific Integrated Circuits (ASICs).

45. The network switch according to claim 37, wherein said network processor is implemented in one or more Field Programmable Gate Array (FPGA) integrated circuits.

46. A system for protecting point-to-multipoint (P2MP) Label Switched Paths (LSPs) in a hierarchical ring based network having a plurality of nodes connected by one or more facilities, each facility comprising a plurality of LSPs, said system comprising:
- means for provisioning at least one point to point (P2P) protection tunnel, said at least one P2P protection tunnel for protecting a particular node; and
- said at least one P2P protection tunnel operative, upon failure of a facility protected thereby, to transport packets from a plurality of first P2MP LSPs carried over said facility such that upon exiting said P2P protection tunnel, said packets are transmitted over a plurality of second P2MP LSPs which are different than said plurality of first P2MP LSPs they originated from and over said plurality of first P2MP LSPs.

47. The system according to claim 46, wherein said network comprises a ring based Multiprotocol Label Switching Protocol (MPLS) network.

48. A method of multicast service protection in a network constructed from a hierarchy of connected rings, said method comprising the steps of:
- first provisioning a multicast connection over a primary point-to-multipoint (P2MP) Label Switched Path (LSP) and a secondary P2MP LSP;
- in each ring, splitting said multicast connection into a primary sub-LSP originating at a primary node and a secondary sub-LSP originating at a secondary node, said primary sub-LSP running in a direction opposite to said secondary sub-LSP, wherein said primary sub-LSP is configured to forward packets to a primary sub-LSP of descendant rings and wherein said secondary sub-LSP is configured to forward packets to a secondary sub-LSP of descendant rings; and
- in each ring, second provisioning a point-to-point (P2P) protection tunnel from a node to be protected to a node downstream thereof, wherein, in the event of a failure, packets are transported to a different LSP, including secondary LSPs on all descendent rings for which said downstream node is a secondary node and to the primary LSP on all descendant rings for which said downstream node is a primary node, whereby each P2P protection tunnel is operative to aggregate a plurality of multicast connections.

49. The method according to claim 48, further comprising the step of, in each ring, configuring said downstream node to forward packets received over said protection tunnel to the primary sub-LSP on all descendant rings for which said downstream node is a primary node thereof.

50. The method according to claim 48, further comprising the step of, in each ring, configuring said downstream node to forward packets received over said protection tunnel along the primary sub-LSP of said ring.

51. A method of providing multicast service protection in a hierarchical ring based network having a primary point-to-multipoint (P2MP) Label Switched Path (LSP) and a secondary P2MP LSP running in a direction opposite thereto, said method comprising the steps of:

detecting a node or link failure in said hierarchical ring based network;

directing packets received over a first P2MP LSP to a point to point (P2P) protection tunnel protecting said node or link against said failure; and transporting packets over said P2P protection tunnel to a second P2MP LSP for forwarding over said second P2MP LSP as well as over said first P2MP LSP.

\* \* \* \* \*